(12) United States Patent
Hoshino et al.

(10) Patent No.: US 11,783,571 B2
(45) Date of Patent: Oct. 10, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Shoichi Hoshino, Tama (JP); Masakazu Matsugu, Yokohama (JP); Yusuke Mitarai, Tokyo (JP); Atsushi Nogami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/462,667

(22) Filed: Aug. 31, 2021

(65) Prior Publication Data

US 2021/0397869 A1    Dec. 23, 2021

Related U.S. Application Data

(63) Continuation of application No. 16/389,812, filed on Apr. 19, 2019, now Pat. No. 11,200,440.

(30) Foreign Application Priority Data

Apr. 26, 2018 (JP) ................................. 2018-085521

(51) Int. Cl.
| | | |
|---|---|---|
| *G06V 10/82* | (2022.01) | |
| *G06T 7/00* | (2017.01) | |
| *G06F 3/04845* | (2022.01) | |
| *G06V 10/764* | (2022.01) | |
| *G06V 10/40* | (2022.01) | |
| *G06F 3/04817* | (2022.01) | |

(52) U.S. Cl.
CPC .......... *G06V 10/82* (2022.01); *G06F 3/04845* (2013.01); *G06T 7/0002* (2013.01); *G06V 10/40* (2022.01); *G06V 10/764* (2022.01); *G06F 3/04817* (2013.01); *G06F 2203/04806* (2013.01)

(58) Field of Classification Search
CPC . G06V 10/255; G06T 7/0002; G06F 3/04817; G06F 3/04845; G06F 2203/04806
USPC .................................................. 382/103, 141
See application file for complete search history.

(56) References Cited

U.S. PATENT DOCUMENTS 9,471,972 B2 * 10/2016 Kamioka .............. G06T 7/0008
10,740,892 B2 * 8/2020 Nonaka ..................... G06T 7/60

* cited by examiner

*Primary Examiner* — Daniel G Mariam
(74) *Attorney, Agent, or Firm* — Canon U.S.A., Inc. IP Division

(57) ABSTRACT

Some embodiments are directed to, by a simple operation, appropriately displaying an image to which attention is paid. An information processing apparatus according to some embodiments is an information processing apparatus for performing display for measuring a width of a region in an image of an inspection target object, the information processing apparatus including an acquisition unit configured to acquire a bending position where a bend of a line approximating the region from the image satisfies a predetermined condition, and a display control unit configured to display, in an aligned manner in a predetermined direction, a plurality of partial images obtained by dividing the image based on the bending position.

15 Claims, 18 Drawing Sheets

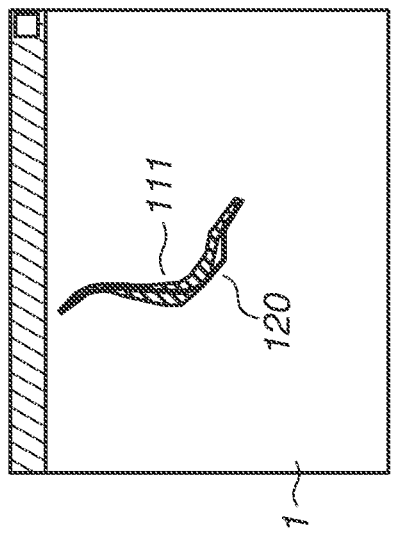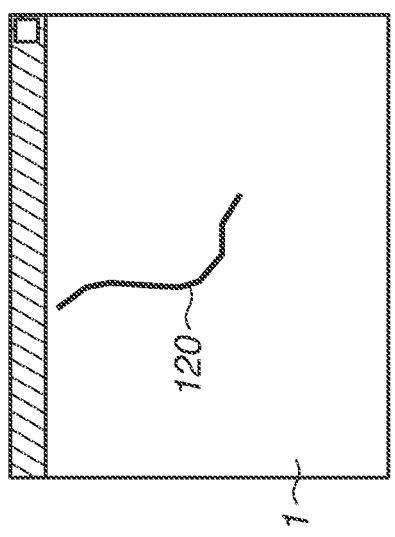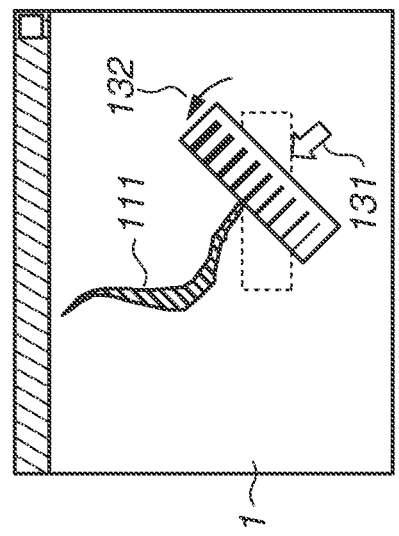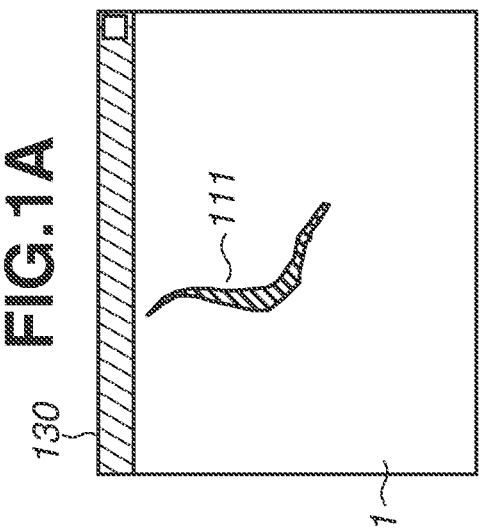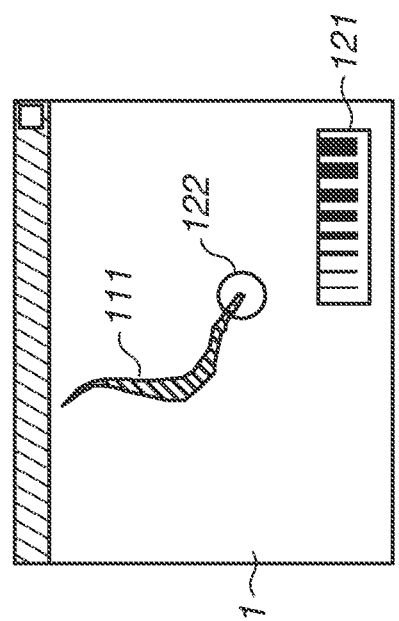

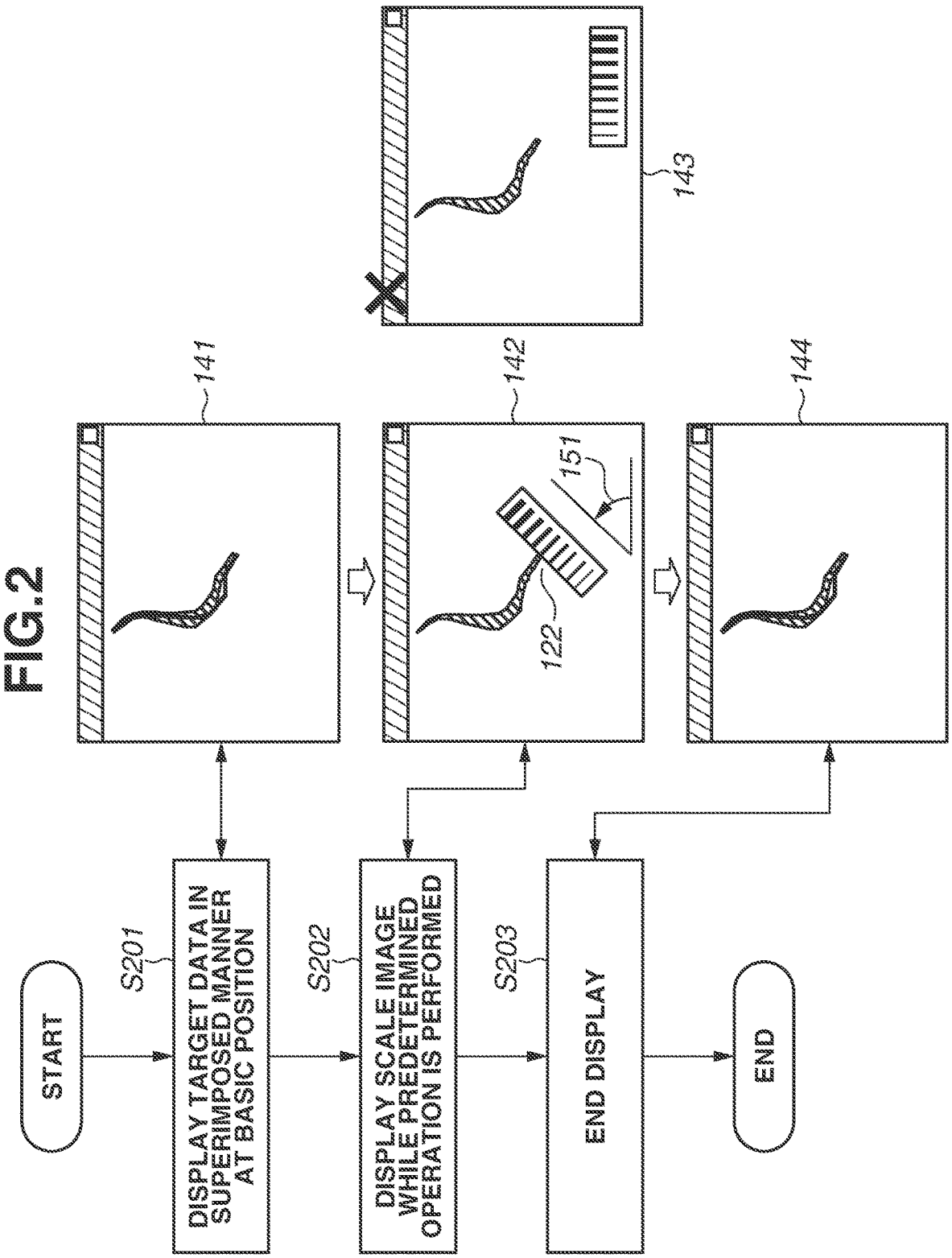

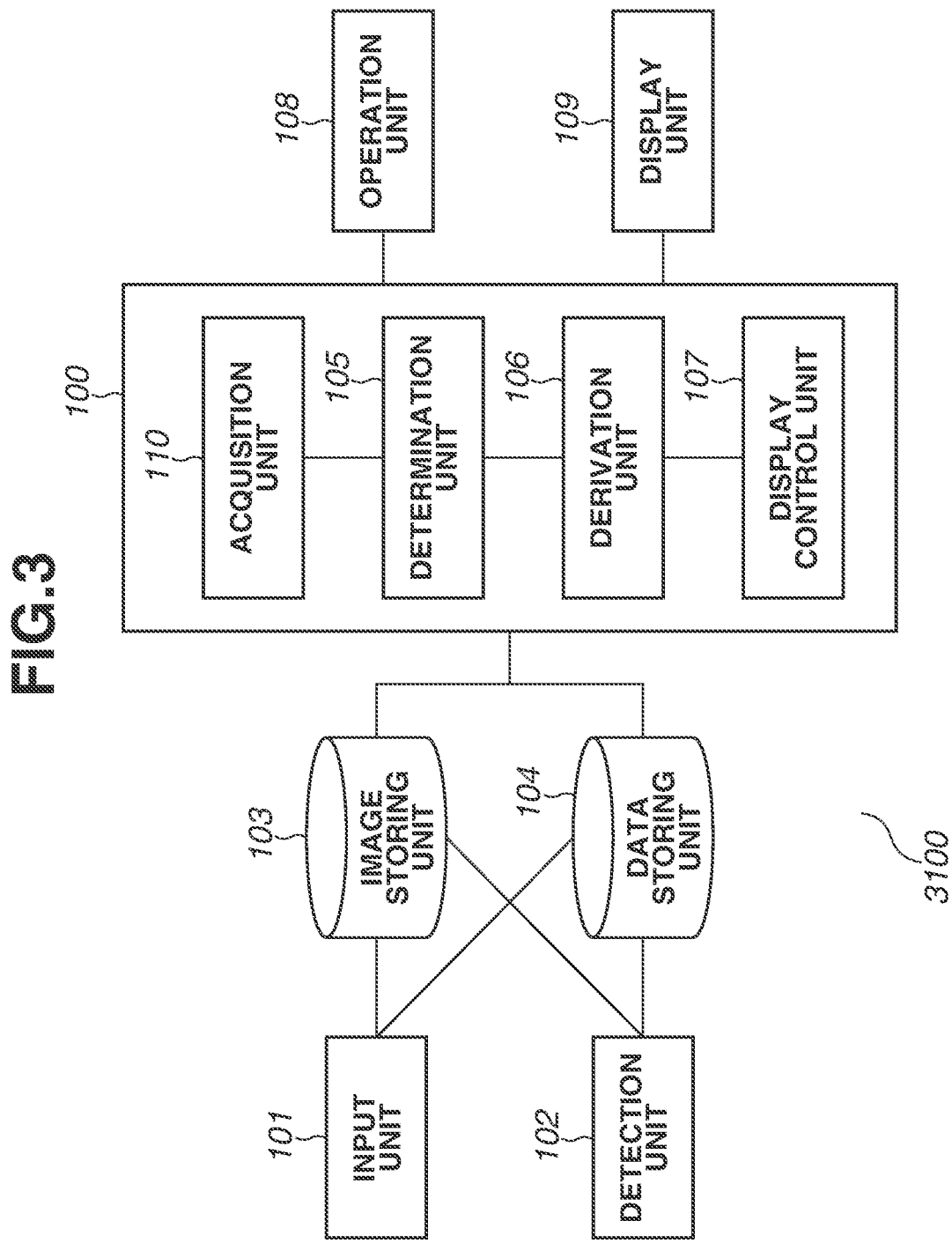

FIG.4A

| ID | TYPE | COORDINATES | NUMERICAL VALUES | REMARKS |
|---|---|---|---|---|
| C001 | CRACK | $(X_{c001\_1}, Y_{c001\_1}), (X_{c001\_2}, Y_{c001\_2}), \cdots, (X_{c001\_n}, Y_{c001\_n})$ | 0.5 mm, 0.3 mm, $\cdots$, 0.2 mm | MAXIMUM OF 0.8 mm |
| C002 | CRACK | $(X_{c002\_1}, Y_{c002\_1}), (X_{c002\_2}, Y_{c002\_2}), \cdots, (X_{c002\_m}, Y_{c002\_m})$ | 0.3 mm, 0.4 mm, $\cdots$, 0.1 mm | MAXIMUM OF 0.4 mm |
| C003 | CRACK | $(X_{c003\_1}, Y_{c003\_1}), (X_{c003\_2}, Y_{c003\_2}), \cdots, (X_{c003\_p}, Y_{c003\_p})$ | 1.2 mm, 1.1 mm, $\cdots$, 0.8 mm | MAXIMUM OF 1.2 mm |
| H001 | EXFOLIATION | $(X_{H001\_1}, Y_{H001\_1}), (X_{H001\_2}, Y_{H001\_2}), \cdots, (X_{H001\_q}, Y_{H001\_q})$ | 7.0 mm, 6.5 mm, $\cdots$, 2.5 mm | MAXIMUM OF 10.3 mm |
| $\cdots$ | $\cdots$ | $\cdots$ | $\cdots$ | $\cdots$ |
| Cxxx | CRACK | $(X_{cxxx\_1}, Y_{cxxx\_1}), (X_{cxxx\_2}, Y_{cxxx\_2}), \cdots, (X_{cxxx\_r}, Y_{cxxx\_r})$ | 0.1 mm, 0.1 mm, $\cdots$, 0.2 mm | MAXIMUM OF 0.6 mm |

FIG.4B

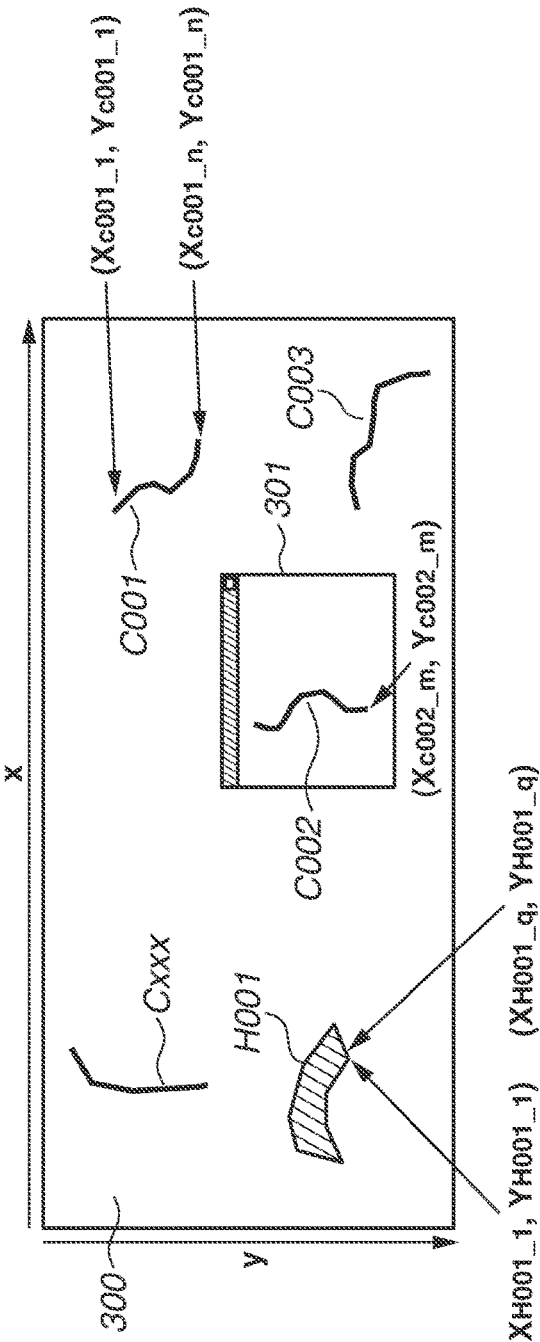

FIG.7A
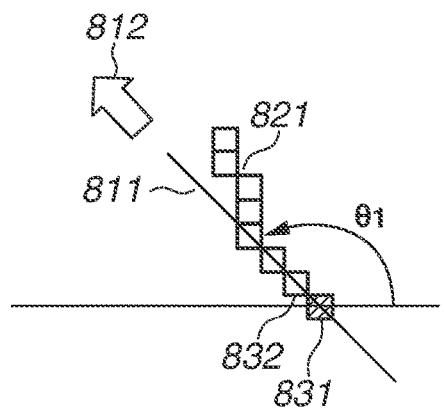
FIG.7B
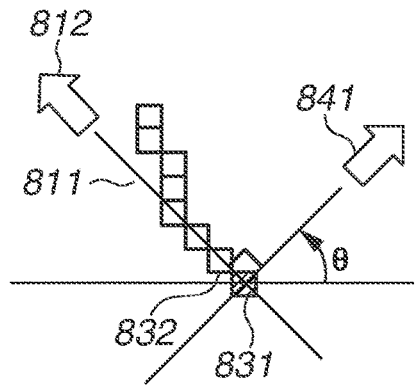
FIG.7C
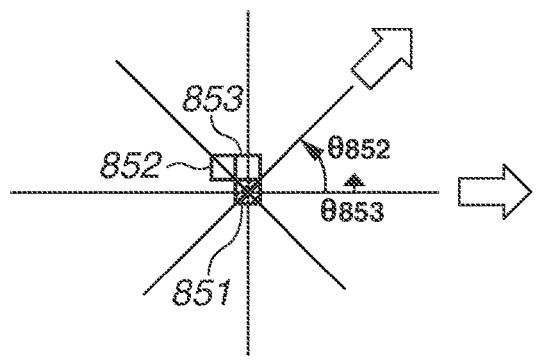
FIG.7D
| θ | ANGLE PARAMETER | AVERAGE |
|---|---|---|
| θ852 | 45° | 22.5° |
| θ853 | 0° | |

INFORMATION PROCESSING APPARATUS, INFORMATION PROCESSING METHOD, AND STORAGE MEDIUM

CROSS-REFERENCE TO RELATED APPLICATIONS

This application is a continuation of U.S. patent application Ser. No. 16/389,812, which was filed on Apr. 19, 2019 and which claims priority to Japanese Patent Application No. 2018-085521, which was filed on Apr. 26, 2018. These applications are hereby incorporated by reference herein.

BACKGROUND

Field

The present disclosure relates to an information processing apparatus for displaying a scale image.

Description of the Related Art

In infrastructure inspection for inspecting the deterioration of a concrete wall surface of a structure, such as a bridge, a dam, and a tunnel, the size of an abnormal region, such as a crack, is estimated from an image obtained by capturing an image of the concrete wall surface. An examination technician or a person in charge of examination checks the estimation result together with the image obtained by capturing the concrete wall surface and corrects the estimation result where necessary. In this work, the image of the concrete wall surface is viewed together with a scale image. Thus, generally, the image of the concrete wall surface and a scale image are displayed in a superimposed manner. In the display, to accurately observe an abnormal region, such as a crack or exfoliation, the scale image may be arranged for the abnormal region. The publication of Japanese Patent Application Laid-Open No. 2009-85785 discusses a method for adjusting the display direction of a scale image to an image as an observation target by a user operation.

In the method discussed in the publication of Japanese Patent Application Laid-Open No. 2009-85785, the user manually sets the direction of the scale image to the direction of a crack. The crack, however, includes many bends and branches. Thus, to measure the crack, it takes trouble to display the scale image by rotating the scale image relative to each bend or branch.

SUMMARY

Various embodiments are directed to appropriately displaying a target image by a simple operation.

According to an aspect of some embodiments, an information processing apparatus for performing display for measuring a width of a region in an image of an inspection target object includes an acquisition unit configured to acquire a bending position where a bend of a line approximating the region from the image satisfies a predetermined condition, and a display control unit configured to display, in an aligned manner in a predetermined direction, a plurality of partial images obtained by dividing the image based on the bending position.

Further features of various embodiments will become apparent from the following description of exemplary embodiments with reference to the attached drawings.

BRIEF DESCRIPTION OF THE DRAWINGS

FIGS. 1A to 1E are diagrams illustrating examples of displays of an image of a crack.

FIG. 2 is a diagram illustrating an example of displays of a scale image in each processing procedure performed by an information processing apparatus.

FIG. 3 is a diagram illustrating an example of a configuration of an information processing system.

FIGS. 4A and 4B are diagrams illustrating examples of target data and an image of an inspection target.

FIGS. 7A to 7D are diagrams illustrating examples of a display parameter.

DESCRIPTION OF THE EMBODIMENTS

Figure 5:
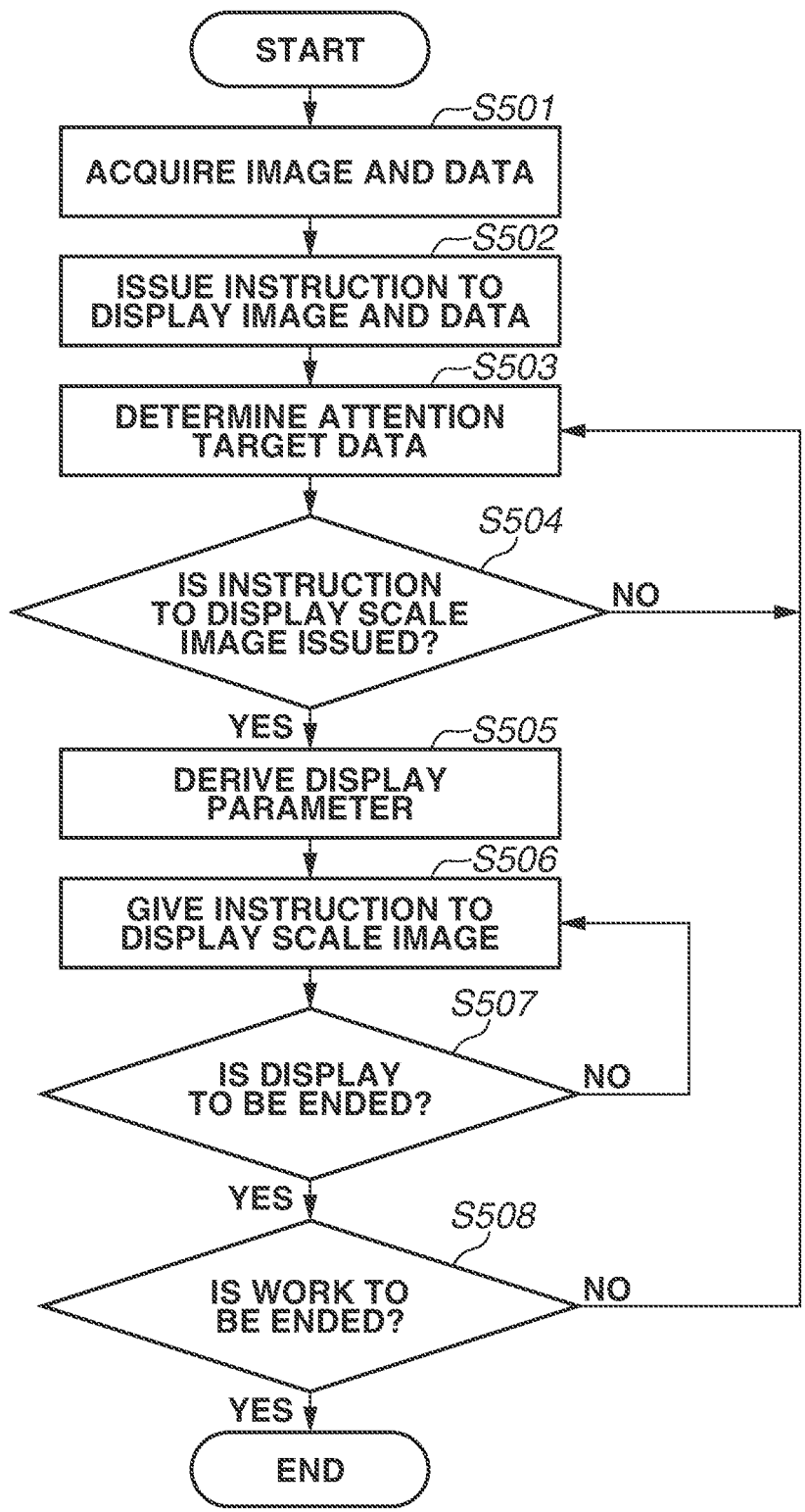
FIG. 5 is a flowchart illustrating a processing procedure of processing performed by the information processing apparatus.

Before the description of exemplary embodiments, the definitions of terms are described.

A scale image is an image of a scale having marks and indices for measuring a target. In the scale image, based on the resolution of an image, widths (e.g., a width of 0.2 mm, a width of 0.5 mm, and a width of 1.0 mm) as indices corresponding to the sizes of actual widths are displayed, for example from left to right in ascending order. These size references (indices) and the width of an abnormal region in the image are compared with each other to measure the size of the width of the abnormal region. In this case, the scale image may be displayed in such a manner that the center of the width of the abnormal region and the center of one of the indices (references) to be compared with the abnormal region are aligned with each other. Also, for example, marks corresponding to actual measured values (e.g., marks indicating 0 mm to 10.0 mm are displayed in 0.1 mm increments) may be used. In this case, the scale image may be displayed in such a manner that a position corresponding to 0 mm are aligned with an end point of the width of the abnormal region. The scale image may be any image representing a length or an area.

An inspection target object refers to an object that is to be inspected, for example a concrete structure in the case of so-called infrastructure inspection for inspecting the deterioration over time of a building, such as a bridge. An image obtained by capturing the inspection target object is inspected to determine whether there is an abnormality on the surface of the inspection target object. The abnormal region refers to a region where some abnormality occurs. In the case of the concrete structure, the abnormal region refers to, for example, a crack in concrete, flaking of concrete, or exfoliation (peeling of a concrete surface). Additionally, the abnormal region refers to a region where there is an abnormality, such as a cold joint (a crack-like pattern appearing on a joint surface of concrete), efflorescence (a lime component of the concrete structure flowing out of a cracked portion), reinforcing bar exposure (a portion where a reinforcing bar in the structure is exposed), or rust fluid. Particularly, a portion of the abnormal region that a user wishes to check is referred as an attention target.

Target data is position information indicating the position where the abnormal region is present. As a specific example, the target data is an image or vector data. In some exemplary embodiments, the target data is an image connecting the centers of the widths of the abnormal region. A method for acquiring the target data will be described below. The target data in the infrastructure inspection refers to, for example, position information represented by a line indicating a crack visually estimated by the user. Alternatively, the target data in the infrastructure inspection may be the result of an automatic detection process performed by an information processing apparatus. The target data is associated with information regarding each of items, such as coordinates, numerical values, and a type and held as a data table. The data table will be described in detail with reference to FIGS. 4A and 4B.

A display parameter is a parameter indicating the amount of movement or the amount of rotation of the scale image from a reference position to appropriately display the scale image for each piece of target data. The display parameter is, for example, an angle parameter indicating the amount of rotation of the scale image about the center of gravity, or a position parameter indicating the position where the scale image is displayed in a certain coordinate system.

With reference to the drawings, a description is given below of some exemplary embodiments.

With reference to FIGS. 1A to 1E and 2, a description is given of an overview of a first exemplary embodiment that applies to infrastructure inspection.

FIGS. 1A to 1E are diagrams illustrating the states where an image obtained by capturing a concrete wall surface, target data indicating the result of estimating an abnormal region, and a scale image are displayed in a window 130 of a graphical user interface (GUI) application. First, FIG. 1A illustrates the state where only an image 1 of a concrete wall surface, which is an inspection target, is displayed. In the image 1, a crack (abnormal region) 111 is present. FIG. 1B illustrates the state where target data 120 acquired from the image 1 in FIG. 1A by an automatic detection process is displayed. FIG. 1C is a diagram in which the target data 120 in FIG. 1B is displayed in an overlapping manner on the image 1 in FIG. 1A. In FIG. 1C, the actual crack 111 in the image 1 and the target data 120 overlap each other, and therefore, it is difficult for a user to correctly check a portion of the crack 111 in the image 1. In the drawings of the present exemplary embodiment, target data displayed in an application is indicated by a thin line. Although the target data is indicated by a thin line for illustrative reasons, in an actual application, it may be desirable to display the target data by changing a display method, such as changing the line width of the target data, coloring the target data, or changing the type of the line, according to the width of the crack.

A person who inputs target data or a person in charge of examination (hereinafter, a "user") checks the image to determine whether the target data (the width of a detected crack according to the present exemplary embodiment) is correct. In this operation, to measure and determine a target, a scale image may be displayed in a superimposed manner on the image. Thus, as in FIG. 1D, a scale image 121 is displayed in an overlapping manner on the image 1 in FIG. 1A. According to the present exemplary embodiment, an end 122 of the crack 110 is a portion that the user checks. However, the directions of the end 122 of the crack 110 in the image 1 and the scale image 121 are not aligned with each other, and therefore, it is difficult to measure the end 122. Thus, it is difficult for the user to check the width of the end 122. To facilitate the determination of whether the target data is correct, it may be useful to adjust a display method for displaying the scale image 121. In this case, the user estimates the width of the end 122 of the crack 110. FIG. 1E illustrates the state where the scale image 121 in FIG. 1D is displayed in a superimposed manner on the image 1 while the scale image 121 is moved in the direction of an arrow 131 and rotated in a direction 132 according to the direction of the end 122. According to the present exemplary embodiment, one of the marks of the scale image that facilitates comparison is set to the crack 110 based on the value (the width) of the target data to which attention is paid. The scale image is displayed as in FIG. 1E, so that the width of the end 122 of the crack 110 can be easily checked. The scale image is thus displayed in a superimposed manner while the display method for displaying the scale image is adjusted. This is an effective display method.

However, in a case where the scale image is displayed as in FIG. 1E, it may be useful to set an appropriate angle of the scale image based on a selected target data and rotate the scale image. Further, in a case where there is a plurality of abnormal regions, a direction in which the user observes an abnormal region differs in each portion to which the user pays attention. Thus, it may be useful to set the direction of the scale image to each region where there is an abnormality. Thus, in a conventional method, it may not be easy to appropriately display a scale image to each region to which attention is paid. That is, it may be very cumbersome for a user to set the angle each time according to data to which attention is paid. According to the present exemplary embodiment, an appropriate display parameter regarding the scale image is automatically or semi-automatically derived, and the image and the scale image are displayed in a superimposed manner. First, with reference to FIG. 2, a description is given of the processing procedure executed by a display control unit of an information processing apparatus according to the present exemplary embodiment.

In S201 in FIG. 2, a display control unit 107 controls a display unit 109 to display target data in a superimposed manner at a basic position in an image. Display 141 of an application at this time is in the state where, similarly to FIG. 1C, an image of a concrete wall surface and target data completely overlap each other, and therefore, it is difficult to visually check an image of a position overlapping the target data. In S202, the display control unit 107 controls the display unit 109 to display target data selected by the user, and, in a case where a command to display a scale image is given, display the scale image. In the example of FIG. 2, an end 122 of the target data is selected, and then, a predetermined key (e.g., a control key) is pressed. As a result, the scale image is displayed in such a manner that the scale image is adjusted to the selected target data. In response to an input from the user, the target data is hidden as in a display 142, and simultaneously, the scale image moved to an appropriate position is displayed in a superimposed manner. Meanwhile, a display 143 illustrates an example where the scale image is displayed at a fixed position. In a case where the scale image is displayed as in the display 143, it is still difficult for the user to compare the scale image with an image of the portion of the target data. According to the present exemplary embodiment, an appropriate angle (hereinafter referred to as "angle parameter") is automatically derived based on the displayed data. In the example of FIG. 2, an angle 151 is the appropriate angle parameter that is automatically derived. Thus, the user can obtain an image in which a display suitable for measuring and determining a target on an image is performed, by simply selecting or specifying any of cracks in the target data without inputting the angle parameter. In S203 in FIG. 2, in response to receipt of a command to end the display (e.g., releasing the key) by a user operation from an operation unit 108, the display control unit 107 controls the display unit 109 to end the display of the scale image. The display returns to a display 144 that has been displayed before the scale image is displayed.

A description is given of work at a stage prior to the execution of the exemplary embodiment. FIG. 3 illustrates a block diagram of an example embodiment of an information processing system 3100 including an information processing apparatus 100. According to the present exemplary embodiment, the result of performing crack inspection is to be prepared. An input unit 101 and a detection unit 102 are functional components for performing crack inspection. An image storing unit 103 stores an image of a concrete wall surface as an inspection target. The estimation result of a crack estimated by a user (input operator) is input to the input unit 101, and the input unit 101 generates target data from information on the input estimation result. The detection unit 102 automatically detects an abnormal region from the image and generates target data from information on the detected abnormal region. A data storing unit 104 in FIG. 3 stores the target data obtained by the input unit 101 or the detection unit 102.

The input unit 101 references an image read from the image storing unit 103, and the result of an abnormal region estimated by the user is input to the input unit 101. Target data is information having the result of automatically detecting a target, such as a crack on the concrete wall surface, or the recorded input result by the user. The target data can be acquired by the following methods. A description is given of a method for manually collecting the target data. In this method, the input unit 101 acquires an image of the concrete wall surface from the image storing unit 103. While checking the image of the concrete wall surface, the user inputting target data inputs information on the position of the target, for example, a crack and the width of the crack. The data storing unit 104 stores target data of the concrete wall surface of a structure generated by this input work. There is a case where the user wishes to check the target data input by the user themselves during this input work. In this case, based on the input target data, an image to be displayed may be generated by executing processing described below and presented to the user. In this case, the user gives a command to change the display, or sets a crack width measurement mode in advance. If the user places, by an operation such as a mouse-over, the arrow of a pointer at the portion where the user measures and determines a target, then based on selected input target data, a display parameter of a scale image is derived, and a reference for measuring and determining an image near the target data is displayed.

The detection unit 102 automatically detects an abnormal region based on an image. The detection unit 102 acquires an image of the concrete wall surface from the image storing unit 103. The detection unit 102 automatically detects an abnormal region from the obtained image. The data storing unit 104 stores this detection result as target data. As a method for automatically detecting the target data, conventional art may be used. For example, a technique for learning an image feature of a target in advance using an image to which the target data is input, and detecting the target based on this learning result may be used. As a technique for automatically detecting deformation based on learning, for example, a technique such as Zhang Wenyu et al., Automatic crack detection and classification method for subway tunnel safety monitoring, SENSORS 14 (10), 2014 is discussed.

The image storing unit 103 stores an image obtained by capturing the concrete wall surface as the inspection target. According to the present exemplary embodiment, a red, green, and blue (RGB) color image captured by an imaging apparatus is used. The image may be any data in which an abnormal region can be observed. For example, the image may be captured by a grayscale camera, an infrared camera, a wide angle lens camera, or a panoramic camera.

The data storing unit 104 stores target data acquired by the above technique. Further, the data storing unit 104 may store target data recorded by actually observing the structure by close visual observation. Further, the data storing unit 104 may store target data in which pieces of target data acquired by these different techniques are mixed together. Further, the data storing unit 104 stores target data acquired by the above technique as a data table associated with information regarding each of items such as coordinates, numerical values, and a type.

With reference to FIGS. 4A and 4B, the data table is described. The data table is a table representing the result (target data) of detecting an abnormal region included in an image and related data (coordinates). FIG. 4A illustrates an example of the data table representing information regarding target data. The data table in FIG. 4A in which pieces of target data are arranged includes information regarding each of the items, such as an identification (ID), the type of abnormal region, the coordinates in the image, and numerical values indicating the estimation result. Specifically, the data table in FIG. 4A represents all pieces of target data (corresponding to the coordinates and the numerical values) obtained by detecting abnormal regions in an image 300 illustrated in FIG. 4B, and the attributes (corresponding to the ID, the type, and remarks) of each piece of target data. The outline of each item of the data table is described. The ID is a unique code assigned to each of the detected abnormal regions. For example, the ID is a number automatically assigned based on the order of input by the user or automatically assigned by an application for detecting target data. The type is the classification of an abnormal region that should be detected from the image of the inspection target. In the case of infrastructure inspection, the type refers to an abnormality such as a crack or exfoliation. These types are estimated by the user or the application. The coordinates represent the coordinates where target data is present. According to the present exemplary embodiment, the coordinates are coordinate values in an image coordinate system. For example, the coordinates of crack target data having the ID "C001" are represented by two-dimensional coordinates at n points from $(X_{c001\_1}, Y_{c001\_1})$ to $(X_{c001\_n}, Y_{c001\_n})$, and a single numerical value corresponds to each coordinate point. A coordinate value, such as $X_{c001\_1}$, may be either a coordinate value in an image coordinate system of the image of the concrete wall surface, or a surface coordinate value in the actual structure. Each of the numerical values is a numerical value indicating the size of an abnormal region (e.g., the width of a crack) at corresponding coordinates. These numerical values may have different meanings with respect to each type of abnormal region. For example, each of the numerical values of exfoliation having the ID "H001" is the width of the exfoliation at corresponding coordinates. In the target data, information other than these items may be stored. For example, in FIG. 4A, a numerical value with respect to each ID (the maximum width of the crack or the maximum width of the exfoliation) is recorded as remarks.

Further, FIG. 4B illustrates the relationship between the image of the concrete wall surface and the data table. The image of the concrete wall surface is a high-resolution image so that a minute target, such as a crack, is observed. Thus, generally, an image of the wall surface of the entirety of a certain structure is a very large image. The image 300 in FIG. 4B is a large image (e.g., an image having hundred thousand x hundred thousand or more pixels) of the wall surface of a structure and has an image coordinate system based on an x-axis and a y-axis. Even if the entirety of such a large structure image 300 is displayed, it is difficult to check a minute target on the concrete wall surface. Thus, normally, a part of the image 300 is displayed in an enlarged manner. For example, a display window 301 in FIG. 4B illustrates the state where only a part of the image 300 is displayed by application software. Consequently, it is possible to enlarge a crack C002 and measure and determine the crack C002 in detail. Normally, when checking target data, the user thus displays any portion of the image of the concrete wall surface in an enlarged manner. In the following description, an image displayed in an application window illustrated in the exemplary embodiments and the drawings is in the state where a part of the entirety of the image 300 of the concrete wall surface is displayed in an enlarged manner as in the display window 301 in FIG. 4B.

FIG. 4B illustrates the state where a crack C001 is represented by position information on successive pixels including n points from $(X_{C001\_1}, Y_{C001\_1})$ to $(X_{C001\_n}, Y_{C001\_n})$. Target data of this crack may be displayed by, for example, changing its color based on the numerical value of the width of the crack such that less than 0.2 mm is green, and 0.2 mm to 0.5 mm is blue. Further, the target data may be represented by vector data of a polyline or a bend including a plurality of points. In a case where the target data is represented by vector data, the amount of the data decreases, and the target data is more simply represented. As another example illustrated in FIGS. 4A and 4B, exfoliation having the ID "H001" is present as a target. In a case where the exfoliation is represented by a polyline, the exfoliation is a target having a region surrounded by the polyline. For illustrative reasons, in FIGS. 4A and 4B, the target data is displayed in monochrome representation. However, in a suitable exemplary embodiment, actually, the target data is displayed by changing its color according to the type or the value of the attribute (the width) of the target data. This is the description of the work at the stage prior to the present exemplary embodiment.

FIG. 3 is a diagram illustrating an example of the functional configuration of the information processing apparatus. The information processing apparatus 100 displays a scale image for measuring each abnormal region in an image of the inspection target object. The information processing apparatus 100 includes an acquisition unit 110, a determination unit 105, a derivation unit 106, and a display control unit 107. The details of processing executed by these functional components will be described below in the part of a flowchart. The information processing apparatus 100 and related components can be achieved by a processor, including a central processing unit (CPU), a memory, a storage device, an input/output device, a bus, and a display device, executing software (a program) acquired via a network or various pieces of information recording media. As the computer hardware, a general-purpose computer may be used, or hardware optimally designed for software may be used. The information processing apparatus 100 is connected to an operation unit 108 that receives an operation of the user, and a display unit 109 on which an image and target data are displayed for a user. According to the present exemplary embodiment, the operation unit 108 is a keyboard and a mouse, and the display unit 109 is a display. These components, however, are not limited to these, and may have other configurations. For example, the operation unit 108 may be a pen tablet, or the operation unit 108 and the display unit 109 may be configured together by a tablet.

Based on the above processing, the user then checks whether the prepared estimation result of target data is correct. For example, after the user inputs target data, the user checks whether the input result is correct, or after an automatic detection process is performed, the user checks whether the automatic detection result is correct. According to the present exemplary embodiment, a description is given below of the exemplary embodiment in the state where an image and target data are stored in the image storing unit 103 and the data storing unit 104.

FIG. 5 is a flowchart regarding processing executed by the information processing apparatus 100. An overview of the processing is described here with reference to FIGS. 2 and 5, and the details of the processing will be described below. The information processing apparatus 100 may skip some of the processing procedure described in this flowchart.

First, in S501, the acquisition unit 110 acquires, from the image storing unit 103 and the data storing unit 104, an image and target data indicating the position where an abnormal region is present.

In S502, the display control unit 107 instructs the display unit 109 to, as a basic display state, display the target data in a superimposed manner on the image acquired in S501 on a display screen. The superimposed display in S502 is display in which the target data is displayed in a superimposed manner on the image based on the coordinate values of the target data, and the target data is displayed overlapping the position of the target data in the image. This is the state where, for example, as in the display 141 in FIG. 2, it is difficult to check the original image due to the target data displayed in an overlapping manner.

In S503, based on an instruction from the user or the display on the screen, the determination unit 105 determines, in the target data, attention target data (a first position) in which the user measures the width of the abnormal region. According to the present exemplary embodiment, the attention target data is, in the target data corresponding to the abnormal region to be subjected to the checking work by the user, data indicating the position where the width of the abnormal region is measured. Normally, as in FIGS. 4A and 4B, a plurality of continuous target data is present in the image. If a display parameter such as an angle parameter is set while all these pieces of target data are taken into account, the thus obtained display is sometimes not suitable for measuring and determining each portion of the abnormal region to which the user pays attention. Thus, in S503 in FIG. 5, the attention target data is determined from the plurality of pieces of target data based on an instruction from the user or the display state of the screen.

Figure 6A:
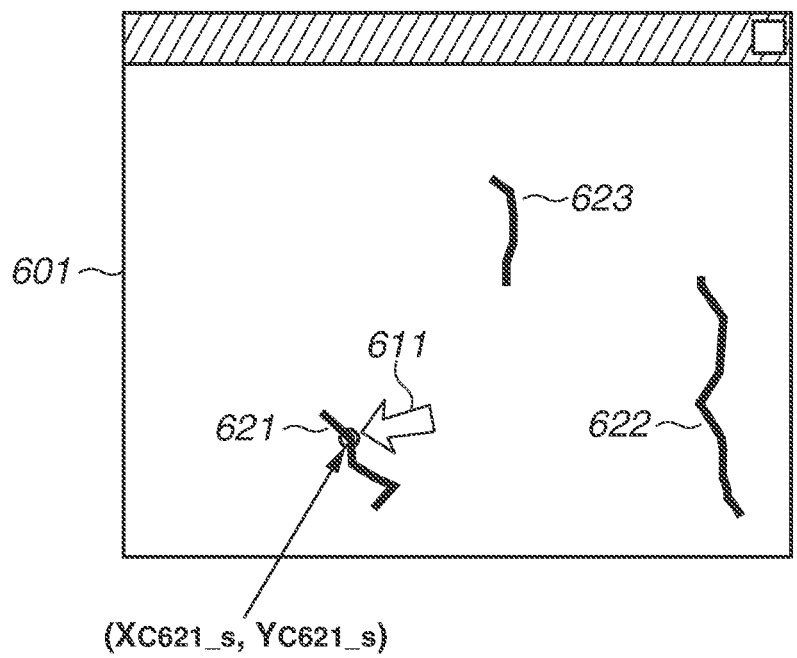
FIGS. 6A and 6B are diagrams illustrating examples of attention target data.
Figure 6B:
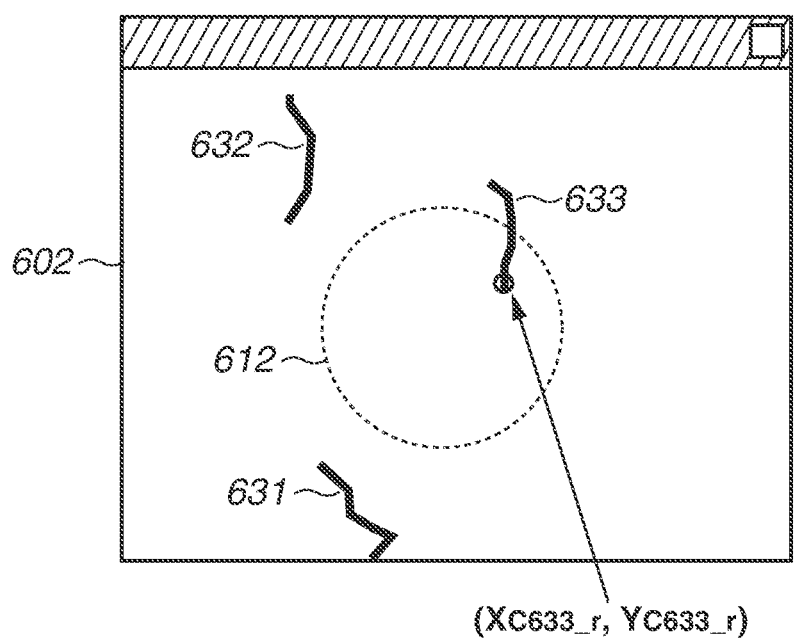

With reference to FIGS. 6A and 6B, a method for determining the attention target data is described. FIGS. 6A and 6B illustrate the states where parts of the image 1 are displayed in application windows 601 and 602. First, a method for determining the attention target data based on user selection is described. That is, coordinates in the image input by the user are determined as the attention target data (the first position). In FIG. 6A, pieces of target data 621, 622, and 623 are present as pieces of target data indicating cracks. FIG. 6A illustrates the state where the user selects a single point $(X_{C621\_s}, Y_{C621\_s})$ in the crack 621 by a click or a mouse-over using a mouse cursor 611. As the simplest example of a method for selecting the attention target data by user selection, the selected target data $(X_{C621\_s}, Y_{C621\_s})$ is determined as the attention target data. If the user inputs a determination instruction in the state where the target data is thus selected, the determination unit 105 determines the target data currently selected as the attention target data. As a method for determining a single point included in the attention target data, a point selected by the user may be used, or the center of gravity of the target data may be used, or an end of the target data may be used.

Next, a method for determining the attention target data based on the display on the screen is described. That is, a position at a smaller distance from the center of the screen on which the image is displayed is determined as the attention target data (the first position). For example, it is considered that the user tends to display an abnormal region to which the user pays particular attention, in such a manner that the abnormal region is placed at or close to the center of the window. Thus, a scale image is adjusted based on target data located near the center of the window, to facilitate the measurement and the determination of an abnormal region present near the center of a displayed image. With reference to FIG. 6B, this example is described. In FIG. 6B, pieces of target data 631, 632, and 633 are present as pieces of target data indicating cracks included in a part of the image. FIG. 6B is a diagram illustrating an example where the attention target data is determined from a region of interest obtained by weighting particularly a center region of the screen displayed in the window 602. In this example, the attention target data is determined from target data included in a region 612 in a center portion of the window 602. In FIG. 6B, specifically, in the target data 633, a point $(X_{C633\_r}, Y_{C633\_r})$ close to the center is determined as the attention target data. Alternatively, a center region may be set inside a region having a radius r from its center, and target data included in the center region may be determined as the attention target data. A plurality of pieces of target data included in a center region may be extracted, and a position at the smallest distance from the center of the center region among the plurality of pieces of target data may be determined as the attention target data. As an example of the region of interest, a region in a center portion of the window 602 is used. However, not only this, and also another region may be set. For example, the display unit 109 may include an image capturing device and acquire the line-of-sight direction of the user, and a peripheral region of the line-of-sight direction may be used as the region of interest. As a method for determining a single point included in the attention target data, a point on the target data at the shortest distance from the center may be used. Further, not only the above method, but also another method may be used. For example, the center of gravity of the extracted target data may be used, or an end point of the target data may be used.

A description has been given above of the exemplary embodiment in which a single piece of target data is determined as the attention target data. Alternatively, it may be also configured in such a manner that a plurality of pieces of target data is able to be determined as the attention target data. That is, in a case where the determination unit 105 determines a plurality of pieces of attention target data (the first position), the derivation unit 106 derives a display parameter for each of the plurality of pieces of attention target data (the first position). In this processing, the display control unit 107 selects one of a plurality of display parameters based on an instruction from the user and display the scale image. For example, in a case where the user determines the attention target data, a plurality of pieces of attention target data is determined by, for example, the operation of clicking target data using the mouse while pressing a predetermined key such as a shift key, or the operation of tracing target data while performing a mouse-over. Further, in a case where the attention target data is determined based on the display on the screen, for example, both ends or a center portion of target data displayed in the screen may be determined as the attention target data. A display parameter in a case where a plurality of pieces of attention target data are thus determined may be derived for only one of the pieces of attention target data, or may be derived for each piece of attention target data according to a method described below. In a case where the concrete wall surface is inspected, there is a possibility that cracks having similar widths occur in neighboring regions. Thus, the inclinations of the respective cracks are simultaneously derived, whereby the user can display the scale image in various manners by a single operation.

In S504, the information processing apparatus 100 determines whether an instruction to display a scale image adjusted to the attention target data determined in S503 is issued. The instruction from the user is input using the operation unit 108. In a case where the instruction is issued (YES in S504), the processing proceeds to S505. In a case where the instruction is not issued (NO in S504), the processing returns to S503. In S503, determination of the attention target data is performed again. For example, in a case where the display is changed while a key continues to be pressed in S503, the operation of releasing the key is the instruction from the user received in S504. Further, the operation of pressing a key once is an operation indicating a start, the operation of pressing the key again is an operation indicating an end. The instruction from the user is not limited to these operations, and may be another operation method. For example, the instruction from the user may be the operation of clicking not a key but an icon on a predetermined GUI using an interface device such as the mouse. Further, the instruction may be the operation of clicking or mousing over attention target data that the user wishes to measure and determine in detail. If the user manually determines the attention target data in S503, S504 may be skipped.

In S505, the derivation unit 106 derives a display parameter for displaying the scale image according to the inclination or the position of the attention target data. That is, the derivation unit 106 derives, from the attention target data (the first position) and at least one point (a second position) of the attention target data, the inclination of the abnormal region to a horizontal direction in the display screen on which the image is displayed. The display parameter is a parameter for displaying the scale image at a position or an angle where the width of a portion of the abnormal region can be measured. According to the present exemplary embodiment, the display parameter is an angle parameter for rotating the scale image to the inclination of each portion of the abnormal region. In the display of the image described below, the scale image is rotated according to the angle parameter derived at this processing and is displayed in a superimposed manner near the target data on the image. The angle parameter can be obtained based on, for example, information regarding the attention target data. FIG. 7A is a diagram illustrating target data 821 indicating a crack. In this case, in S503, a pixel 831 in the target data 821 is determined as an attention target pixel. A target pixel (the second position) is determined using pixels included in the target data 821 among eight pixels adjacent to the attention target pixel 831. A direction 812 of a straight line 811 connecting the attention target pixel 831 and a target pixel 832 is the direction of the principal line of the attention target pixel 831. An angle $\theta_1$ formed by the direction 812 can be obtained by the following formula.

$$\theta_1 = \arctan\left(\frac{Y_{c821\_832} - Y_{c821\_831}}{X_{c821\_832} - X_{c821\_831}}\right) \quad (1)$$

In this formula, $(X_{C821\_831}, Y_{C821\_831})$ and $(X_{C821\_832}, Y_{C821\_832})$ represent the coordinate values of the attention target pixel 831 and the target pixel 832, respectively. From the direction of the principal line (the angle $\theta_1$) of this attention target data, an angle parameter $\theta$ indicating the amount of rotation of the scale image from its reference direction is derived. The reference direction or position of the scale image is known. For example, a reference for the direction of the scale image is a horizontal direction in the display screen on which the image is displayed. According to the present exemplary embodiment, the reference direction is the direction in which the x-axis direction of the image 1 in FIG. 4B and the long side of the scale image are parallel to each other, and the smallest mark on the scale image is located in the direction of the origin. The angle parameter $\theta$ can be obtained as, for example, an angle formed by a direction orthogonal to the direction of the principal line of the attention target data. In FIG. 7B, the angle $\theta$ formed by a direction 841 orthogonal to the direction 812 (the direction of the principal line of the attention target) is the angle parameter to be obtained. The scale image is displayed on the image using the angle parameter $\theta$, whereby the direction of the principal line of the attention target data and the display direction of the marks of the scale image are aligned with each other. This facilitates the comparison between the attention target data and the scale image.

A description has been given above of a method for deriving the angle parameter from a pixel of the attention target data and a pixel of target data adjacent to the attention target data. In a case where a plurality of pixels of pieces of target data adjacent to the attention target data is present, the angle parameter is not necessarily uniquely determined. FIG. 7C illustrates two target pixels 852 and 853 adjacent to an attention target pixel 851. In FIG. 7C, different angle parameters $\theta 852$ and $\theta 853$ are derived from the target pixels 852 and 853, respectively, adjacent to the attention target pixel 851. In this case, for example, as in FIG. 7D, the result of obtaining a statistic (e.g., the median or the average) of angles as candidates may be displayed, to allow the user to select an appropriate angle parameter. That is, the derivation unit 106 derives a plurality of display parameters from a plurality of target pixels (the second position). In this processing, the display control unit 107 selects one of the plurality of display parameters according to an instruction from the user and displays the scale image.

The method for deriving the angle parameter has been described above with reference to FIGS. 7A to 7D. In the above description, the attention target data and pixels adjacent to the attention target data are used. Alternatively, the angle parameter may be derived using another type of data. For example, in the case of vector data, an angle can also be derived using a target position (the second position) in a region that is not adjacent to the attention target data, but is continuous with the attention target data. The position closest to the attention target data in position information is used as the second position. Alternatively, a position within a distance or a range set in advance is used as the second position. Yet alternatively, a characteristic point in the target data is used as the second position. For example, the center or an end point of the target data is used as the second position. Yet alternatively, for example, main component analysis regarding two-dimensional coordinates may be used for target data in the periphery of the attention target data. In this method using the main component analysis, an obtained main component can be regarded as the direction of the principal line of the attention target data. A direction orthogonal to the main component is the angle parameter to be obtained.

Further, instead of the derivation unit 106, a learning unit can derive the angle parameter by inputting an image including a crack (and target data) to a learning model that has performed learning. In this case, the angle parameter is the amount of rotation of the scale image that is set by the user and satisfies a predetermined condition with respect to the width of an abnormal region. In the learning unit, the image including the crack is input to the model that has performed learning, and the model outputs the angle parameter for rotating the scale image to satisfy the predetermined condition. Specifically, for example, the learning model is caused to learn the angle parameter set by the user (the amount of rotation of the scale image orthogonal to the width of the crack) as a correct value. The learning model is used for the derivation unit 106, whereby it is possible to display the scale image in an easily viewable manner for the user.

A description has been given above of the exemplary embodiment in a case where target data is represented by successive pixels. As another exemplary embodiment, for example, in a case where target data is represented by a polyline, the angle parameter can be obtained from polyline information. Specifically, the direction of the polyline near a selected position is regarded as the direction of the principal line of the attention target, and a direction orthogonal to the direction of the principal line is determined as the angle parameter.

In S506, the display control unit 107 instructs the display unit 109 to display the scale image adjusted based on the display parameter derived in S505 in a superimposed manner on the image acquired in S501. That is, based on the inclination derived by the derivation unit 106, the display control unit 107 displays the scale image on the image such that the abnormal region and the scale image have a predetermined angle. The predetermined angle is about ±5 degrees from perpendicular between the abnormal region and the scale image. To measure the width of the abnormal region, if the scale image is placed orthogonal to the width of the abnormal region, it is easy to compare the scale image and the abnormal region. The user, however, may be allowed to freely set the angle at which the scale image is displayed.

The scale image is rotated according to this angle parameter and then displayed in a superimposed manner near the attention target data of the image. In this case, the scale image to be displayed may be superimposed at the position of the attention target data, or may be combined by offsetting the scale image from the attention target data based on an instruction from the user. As a case where the scale image is combined by offsetting the scale image, for example, a case is possible where the user fine-adjusts the display position when the coordinates of the target on the image and the coordinates of the target data are not aligned with each other. Further, a plurality of marks (width patterns) of the scale image is set according to the numerical value (the width) of the attention target data. This improves the efficiency of the work of adjusting the marks of the scale image.

In S507, the information processing apparatus 100 determines whether an instruction to end the display of the image is received from the user. In a case where the instruction is received (YES in S507), the processing proceeds to S508. In a case where the instruction is not received (NO in S507), the processing returns to S506. In S506, the image generated based on the derived display parameter continues to be displayed.

In S508, the information processing apparatus 100 receives from the user an instruction to end the display of the data, and determines whether to end the work. In a case where the instruction is received (YES in S508), the display control unit 107 ends the display of the image and the target data. In a case where the instruction is not received (NO in S508), the processing returns to S503 so that determination of the attention target data is performed again, and the checking work is continued.

For the sake of description, S503 and S504 are executed in the above described order. This order, however, may be reversed.

Figure 8:
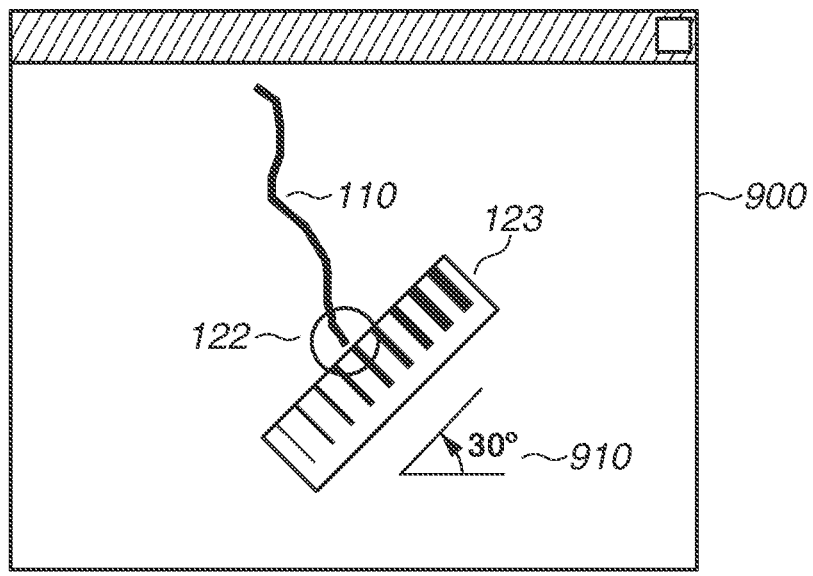
FIG. 8 is a diagram illustrating an example of a display of a scale image.

The image to be displayed that is generated by the above processing is displayed on the display unit 109. FIG. 8 is an example where the image to be displayed is displayed in a window 900 of an application. As compared with FIG. 1D, a scale image 123 in FIG. 8 is located near the end 122 of a crack 110 corresponding to attention target data in target data and is rotated according to the angle parameter θ (30 degrees in this case). This results in the state where the abnormal region that is difficult to check in simple overlapping display (FIG. 1D) is easy to measure and determine. For example, it is easy to compare the end 122 of the crack 110 and the scale image 123. The image to be displayed may be displayed together with information regarding the angle parameter and the like. For example, in FIG. 8, the rotational direction is indicated by an arrow 910. Further, although the angle is represented by a numerical value in the example of FIG. 8, the magnitude of the angle may be represented by brightness or colors.

The derivation unit 106 derives the angle parameter θ as the display parameter. Alternatively, the derivation unit 106 may derive as the display parameter a position parameter for displaying the scale image. If the position of the attention target data is derived as the position parameter, it is possible to display the scale image at the position of an abnormal region that the user wishes to measure. Thus, it is possible to display the scale image by a simple operation.

In S505 in FIG. 5, a description has been given of the exemplary embodiment in which only a single angle parameter θ is derived. Alternatively, a plurality of angle parameter candidates may be derived. For example, the plurality of angle parameters illustrated in FIG. 7D is input to the display control unit 107 in S506 in ascending order of the angle parameters. The display control unit 107 displays the scale image based on the smallest angle parameter and presents the scale image to the user. In this processing, in a case where a user input is received, and the user wishes to display the scale image at another angle, the scale image is displayed according to the angle parameter having the second smallest value. This method is described together with a user operation. For example, control is performed so that every time the user presses a key for changing the angle, the angle parameters are changed and displayed in ascending order of the parameter values. This enables the user to select an appropriate display method from a plurality of display parameters by a simple operation.

Figure 9:
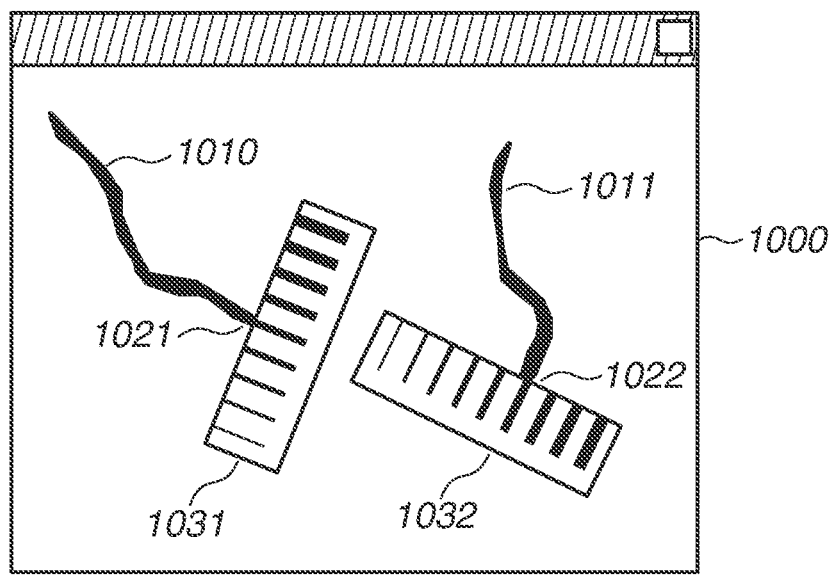
FIG. 9 is a diagram illustrating an example of a display of a plurality of scale images.

In S505 in FIG. 5, the derivation unit 106 generates the image to be displayed based on a single display parameter. In a case where a plurality of pieces of attention target data is selected, the display parameter may be individually derived for each piece of attention target data. Further, the image may be displayed simultaneously using a plurality of display parameters. FIG. 9 illustrates an example where two scale images 1031 and 1032 are displayed in a window 1000 using angle parameters derived for attention target data 1021 in target data 1010 and attention target data 1022 in target data 1011, respectively. As described above, the two pieces of attention target data 1021 and 1022 are displayed such that the pieces of attention target data 1021 and 1022 are easy to compare with the individual scale images 1031 and 1032, respectively.

In S505 in FIG. 5, a description has been given of the exemplary embodiment in which the angle parameter is derived. Alternatively, a configuration may be employed in which the derived angle parameter can be corrected by the user. Specifically, the derived angle parameter θ is displayed in a field on the GUI. The user who wishes to obtain display with an angle parameter different from the derived angle parameter is allowed to change the value of the angular amount θ displayed in the field by inputting. This enables the user to obtain display in which the derived angle parameter is corrected. Further, in the correction of the angle parameter by the user, the user may be allowed to correct the angle parameter not only by inputting a numerical value to the field on the GUI, but also by operating the scale image displayed on the screen using the mouse and directly rotating the scale image. Further, the parameter may be displayed using a bar in the GUI, and the user may be allowed to correct the parameter by moving the bar.

According to the above exemplary embodiment, a description has been given of the exemplary embodiment in which the direction or the position of the scale image to certain attention target data is determined. Alternatively, a configuration may be employed in which the user is allowed to change the attention target data to another piece of attention target data. Specifically, first, the image in which the scale image is displayed is displayed in a field on the GUI. Next, the user who wishes to change the attention target data is allowed to change the attention target data by moving the scale image displayed in the field using an interface device, such as the mouse. This enables the user to change the attention target data while continuing to view the image to be displayed.

Further, a configuration may be employed in which, after the scale image is displayed, the numerical value of the attention target data can be corrected. Specifically, first, the generated image to be displayed is displayed in a field on the GUI. Next, the user who wishes to correct the numerical value of the attention target data is allowed to slide the scale image displayed in the field using an interface device, such as the mouse, while the display angle is maintained. The user is allowed to correct the numerical value of the attention target data by changing the marks of the scale image superimposed at the position of the attention target data. This enables the user to correct the numerical value of the attention target data while viewing the image to be displayed. By the above processing, it is possible to perform correction work while reducing the burden on the user. Further, the information processing apparatus may include a component for learning the above correction work as teacher data. A learning unit (not illustrated) is a learning model to which an image including an abnormal region and vector data as the detection result of the abnormal region are input and which outputs an angle parameter of a scale image or a display image. The learning model may include a neural network and a connection weight parameter of the neural network, and may be, for example, a convolutional neural network (CNN). When rotation display is executed, then instead of the derivation unit 106, the learning unit can derive the angle parameter by inputting an image including a crack (and target data) to the learning model that has performed learning. In this case, the angle parameter refers to the amount of rotation of the scale image that is set by the user and satisfies a predetermined condition with respect to the width of an abnormal region. Teacher data is generated by the user inputting the angle parameter (e.g., the amount of rotation of the scale image) to an image including an abnormal region, and the learning model is caused to perform learning in advance using the teacher data. The learning model learns as the teacher data the angle parameter set as a correct value (a true value) for a display image by the user. The update of the connection weight parameter refers to the process of setting an image on a layer on the input side of the learning model, setting a correct value for an image on a layer of an output image, and adjusting the connection weight parameter of the neural network in such a manner that an output to be calculated via the neural network comes close to the set correct value. Every time the user sets the angle parameter, the learning unit can output a correct amount of rotation. Thus, it is possible to display the scale image in a more easily viewable manner for the user.

<First Variation>

In a first variation, a description is given of a method in which, based on a data table representing the attributes and the state of target data, the determination unit 105 automatically or semi-automatically determines attention target data. For this processing, in the first variation, the data table having information regarding the target data is used. Consequently, it is possible to easily display a scale image suitable for an abnormal region corresponding to each piece of target data.

With reference to FIGS. 4A and 4B, a description is given. The determination unit 105 references the above described data table to determine attention target data. For example, a thick crack is often accompanied by exfoliation or a deposit, and therefore, it is difficult to determine the width of the crack. Thus, a mistake by the person who inputs data or an error in detection is likely to occur. In this case, in the crack, target data having a very wide crack is preferentially checked. In this processing, the determination unit 105 determines, among a plurality of pieces of target data in the image 1, target data of which the type is a crack and the numerical value of the width of the crack is the greatest, as the attention target data. When checking the width of the exfoliation, the determination unit 105 determines, among a plurality of pieces of target data in the image 1, target data of which the type is exfoliation and the numerical value of the width of the exfoliation is the greatest, as the attention target data. Besides the maximum value, the position where the minimum value, the average, the median, or the mode is taken may also be used. In a case where the user wishes to efficiently perform inspection by a simple operation, target data of which the width of the crack is the mode may be determined as the attention target data. Before S503 in FIG. 5, the user inputs in advance the type of an abnormal region to be checked by the user, whereby it is possible to determine the attention target data more efficiently.

Further, as another example, when the user selects target data for each ID (when the user selects each crack), coordinates having the greatest width of the crack among the IDs currently selected may be determined as the attention target data. Further, as yet another example, in a case where the data table includes, as an item, reliability indicating the certainty of the detection result, target data of which the reliability is low may be determined as the attention target data. In a case where the reliability of the target data is low, it is desirable that the user should check the detection result of the target data. Thus, such target data is determined as the attention target data, whereby it is possible to preferentially check the target data in detail. The attention target data is thus determined, to facilitate the measurement of an abnormal region corresponding to target data that should be checked in detail in an image.

Further, according to the display state of the screen, the attributes of target data as the attention target data may be determined. For example, in a case where an image is displayed at high resolution (in an enlarged manner), a pixel of which the value of the width of the crack is the greatest is determined as the attention target data. In a case where an image is displayed at low resolution (in a reduced manner), a pixel of which the width of the exfoliation is the greatest is determined as the attention target data. In a case where an image is displayed at high resolution, there is a high possibility that the user is checking a minute abnormal region such as a crack in detail. Further, meanwhile, in a case where an image is displayed at low resolution, there is a high possibility that the user is checking a large abnormal region such as exfoliation. In this case, a data set of the types of abnormal regions and resolutions suitable for measuring these regions is prepared in advance, and the data set and the data table in FIGS. 4A and 4B are referenced, to determine the attention target data.

<Second Variation>

In a second variation, a description is given of a method for, based on a display parameter, adjusting a display method for displaying an image. Similar to the description of the first exemplary embodiment, the display parameter is an angle parameter. Normally, a crack often progresses in various directions and is often bending. Thus, it is difficult to determine the width of the crack. Thus, a mistake by the person who inputs data or an error in detection is likely to occur. In response, to check whether the width (particularly, the greatest width) of the crack is correct, an image is displayed in comparison with a scale image. In this processing, if the direction of the scale image is adjusted according to a portion of the crack to which attention is paid, the scale image rotates every time the position of interest is changed. Thus, it is difficult to check the transition of the width in a single crack. In such a case, the direction of the display of the scale image is fixed, and the image is rotated. In the case of a bending crack, the image is geometrically transformed to linearize the crack. The crack is thus displayed, whereby the width of the crack can be easily checked regardless of the direction or the shape of the crack.

Figure 10A:
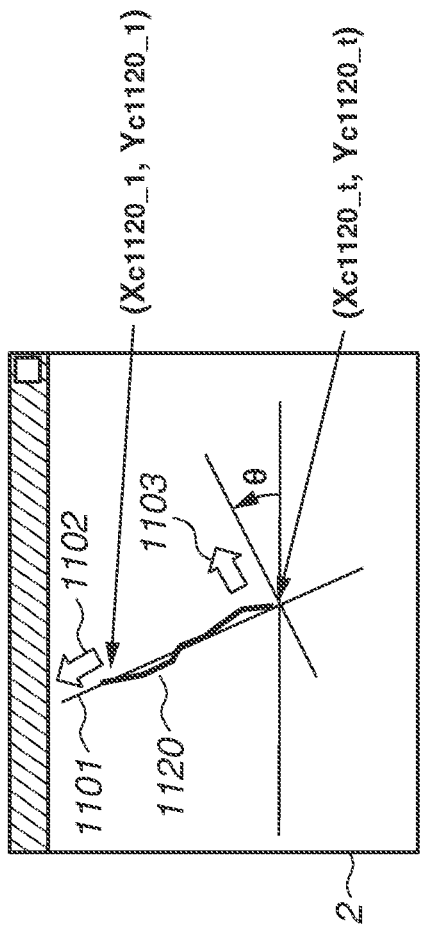
FIGS. 10A to 10D are diagrams illustrating examples of displays of an image of an inspection target.
Figure 10B:
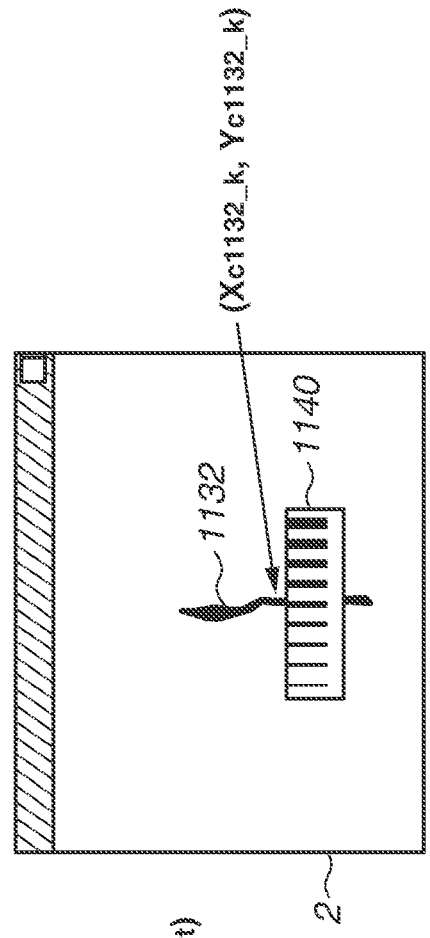
Figure 10C:
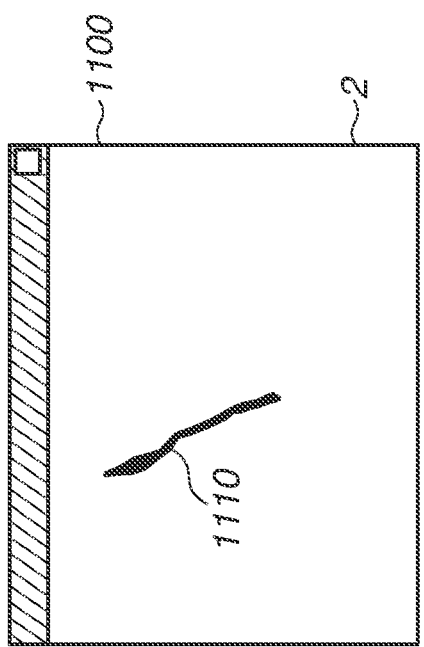

With reference to FIGS. 10A to 10D, a description is given of a method for rotating an image using a single angle parameter. FIG. 10A illustrates the state where an image 2 is displayed in a window 1100, and an abnormal region 1110 is present in the image 2. In FIG. 10B, target data 1120 acquired from the image 2 in FIG. 10A by a detection process or an input process performed by the user is displayed. In this case, an angle parameter for rotating the image 2 is obtained by the same method as the method for deriving the angle parameter for rotating the scale image in the first exemplary embodiment. For example, in FIG. 10B, a direction 1102 of a straight line 1101 connecting both ends (($X_{C1120\_l}$, $Y_{C1120\_l}$) and ($X_{C1120\_r}$, $Y_{C1120\_r}$)) of the target data 1120 is obtained. An angle θ formed by a direction 1103 orthogonal to the direction 1102 is the angle parameter for rotating the image 2. FIG. 10C is a diagram in which the image 2 is rotated according to the angle parameter θ, and a scale image 1140 is superimposed on the image 2. In this case, attention target data is a pixel corresponding to an end ($X_{C1132\_r}$, $Y_{C1132\_r}$) of an abnormal region 1132. In FIG. 10C, the abnormal region 1132 after the rotation is easier to compare with the scale image 1140 than an abnormal region 1131 before the rotation. The image is displayed by thus adjusting the display method for displaying the image, to improve the convenience of an application.

Figure 10D:
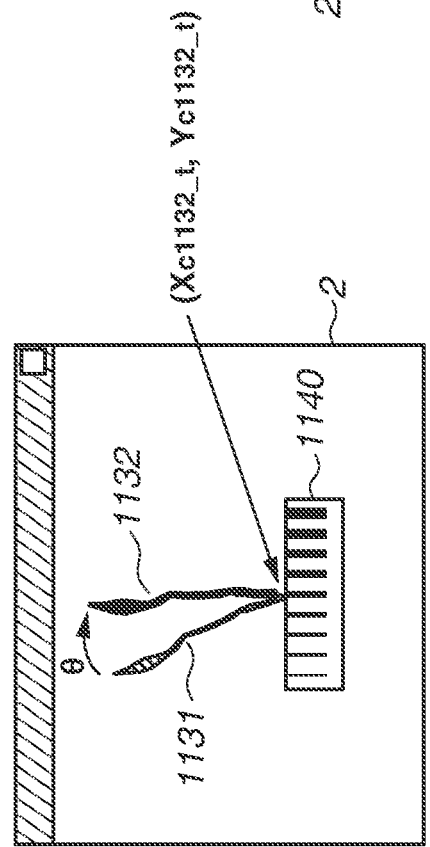

After the processing described above, according to the present exemplary embodiment, the user changes the attention target data. In a case where a linear target as in FIGS. 10A to 10D is measured and determined, even if the attention target data is changed, the image does not need to be rotated further, and the image may only need to be translated according to the coordinates of the attention target data. FIG. 10D is a diagram illustrating the image to be displayed when the attention target data is changed to a portion ($X_{C1132\_k}$, $Y_{C1132\_k}$) near the center of the abnormal region 1132. As described above, in a case where the target is linear, even after the attention target data is changed, it is possible, using only a single angle parameter, to maintain the state where it is easy to compare the attention target data and the scale image.

Figure 11A:
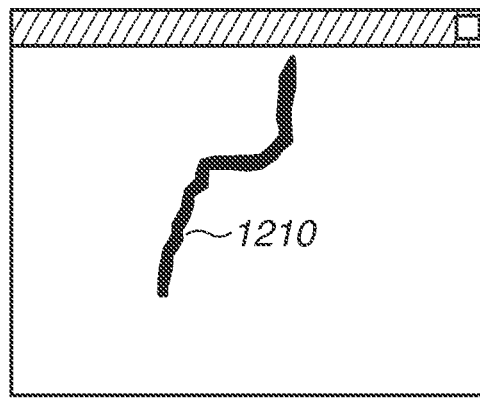
FIGS. 11A to 11I are diagrams illustrating examples of displays of transformed images.
Figure 11B:
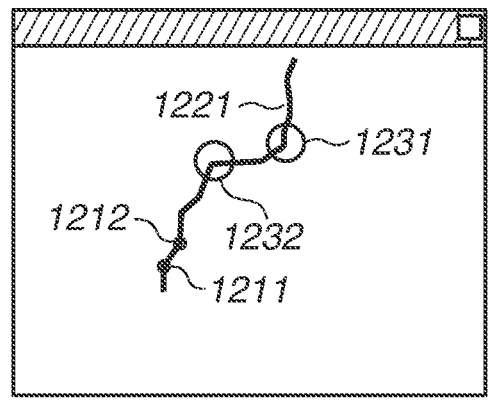

Meanwhile, in FIG. 11A, an abnormal region 1210 having bending points is displayed in a window 1200. A bending point (a bending position) refers to a greatly bending portion (e.g., a bend of 45 degrees or more). In this case, even if the image of the crack is rotated according to only a single angle parameter, it is not possible to perform display that facilitates the measurement of the entirety of the abnormal region. For example, when the image in FIG. 11B is checked, and if attention target data is changed across bending points 1231 and 1232, it may be useful to adjust the rotational angle of the image again. In such a case, using a plurality of angle parameters, the image is partially geometrically transformed in advance, including images (small regions 1252 to 1254 in FIG. 11E) in the periphery of the attention target data to linearize the abnormal region. With reference to FIGS. 11A to 11H, a specific example of this method is described.

In FIG. 11B, target data 1221 acquired from the image in FIG. 11A by an automatic detection process or an input process performed by the user is displayed. The target data 1221 in FIG. 11B is divided at bending points 1231 and 1232. As a method for dividing the target data, for example, similarly to FIGS. 7A to 7D, attention target data (the first position) and at least one other point (the second position) are selected in the target data. In the example of FIG. 11B, a point 1231 on the target data 1221 is determined as the attention target data, and a point 1232 on the target data 1221 is determined as the one other point. Based on these selected points, the inclination of the abnormal region to a horizontal direction in the attention target data 1211 is acquired. Then, these two points are selected again on the target data 1221, and the inclination is repeatedly acquired. The attention target data at a portion where the acquired inclination greatly changes (e.g., 45 degrees or more) is set as a dividing position. As the method for dividing the target data, another method may be used. For example, an approximate straight line is obtained using the method of least squares on a part of the target data. A position immediately before separating from the approximate straight line is determined as a dividing position, and an approximate straight line is repeatedly derived from a part of the target data at the dividing position. Accordingly, it is possible to determine all dividing positions. The method for acquiring an inclination of the abnormal region is not limited to the aforementioned method. An inclination of the abnormal region may be acquired in such a manner that an inflection point of the abnormal region is set as a dividing position, for example.

Figure 11C:
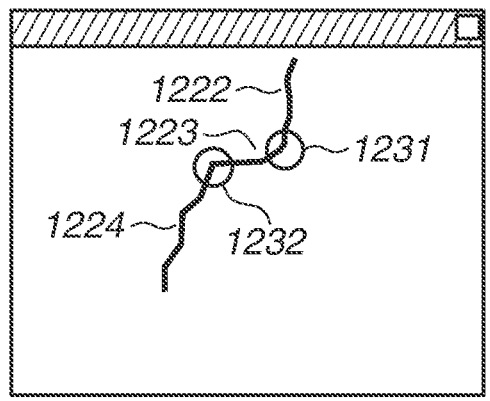

In FIG. 11C, pieces of target data 1222, 1223, and 1224 after the target data 1221 is divided at the bending points 1231 and 1232 are displayed. Angle parameters are derived based on the pieces of target data. As a method for deriving the angle parameters, for example, similarly to FIGS. 10A to 10D, each angle parameter may be derived based on a line segment connecting both ends of the target data.

Figure 11D:
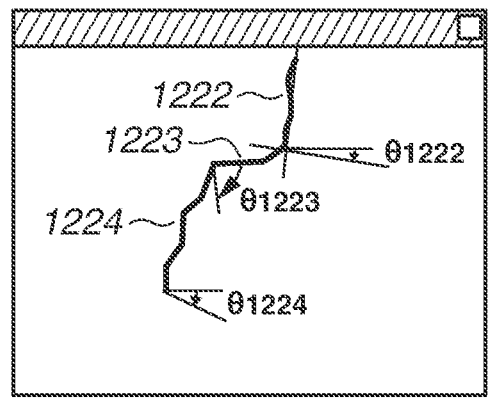
Figure 11E:
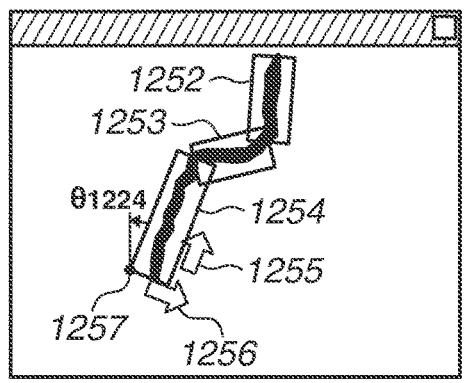

FIG. 11D is a diagram in which angle parameters (θ1222, θ1223, and θ1224) obtained from the pieces of target data (1222, 1223, and 1224) are displayed. Using these angle parameters, images near the abnormal region are rotated. For example, as illustrated in FIG. 11E, the images to be rotated are rectangular regions 1252, 1253, and 1254 surrounding the respective pieces of target data. In this case, for the sake of description, the vertical direction and the horizontal direction of each rectangular region are defined as the direction of a line segment connecting both ends of the target data and a direction orthogonal to the direction of the line segment, respectively.

In the rectangular region 1254 in FIG. 11E, an arrow 1255 indicates the vertical direction of the rectangular region 1254, and an arrow 1256 indicates the horizontal direction of the rectangular region 1254. The vertical length of each rectangular region is determined based on the length of the line segment connecting both ends of the target data. Further, the horizontal length of each rectangular region is basically a fixed length, but may be determined using another method. For example, a method for setting the aspect ratio of a rectangular region in advance and automatically determining the horizontal length of each rectangular region based on the length in the vertical direction of the rectangular region, or a method for setting the horizontal side based on the value of the target data (the size of the abnormal region) in such a manner that the larger the abnormal region, the longer the horizontal side is set. Then, using the obtained angle parameters (θ1222, θ1223, and θ1224), the rectangular regions 1252, 1253, and 1254 in FIG. 11E are rotated in such a manner that the directions of the pieces of target data (the abnormal region) are aligned. As an example, the rectangular region 1254 is rotated counterclockwise by the angle θ1224 about a corner 1257 of the rectangular region 1254. Then, finally, the rectangular regions are translationally moved and joined together by maintaining the order of the pieces of target data. By the above processing, it is possible to geometrically transform an image to linearize target data, and display an image in which the target data is linearized.

Figure 11F:
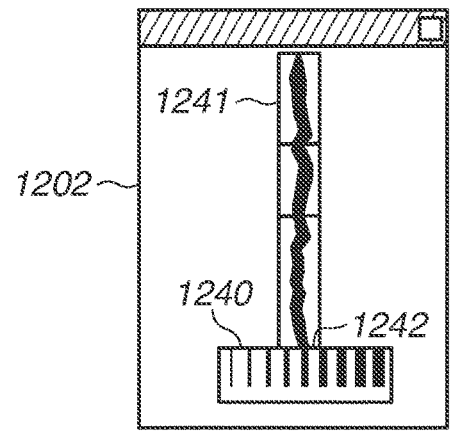

FIG. 11F is a diagram in which an image 1241 after the geometric transformation and a scale image 1240 are displayed in a superimposed manner in a window 1202. The display position of the scale image 1240 is the position of the attention target data, and a lower end 1242 of the target data is the initially selected attention target data. Further, the marks of the scale image 1240 are set according to the value (the size) of the attention target data. In the image 1241 in FIG. 11F, the abnormal region is linearly displayed. Thus, it is easy to check a change in the size of the abnormal region, and it is easy to find a portion having the greatest width. Also in a case where the attention target data is changed, the directions of the abnormal region and the scale image are aligned, and therefore, it is only necessary to translationally move either of the scale image and the image of the abnormal region, and it is not necessary to rotate the scale image or the image of the abnormal region. This facilitates checking of the transition of the size of the abnormal region. Further, in a case where the user wishes to extract an abnormal region having a width greater than a certain reference, a particular reference may be set, and partial images of the abnormal region satisfying the particular reference may be displayed next to each other. In a case where there is a reference for an abnormal region to which the user wishes to pay more attention, it is possible to perform display that is easy for the user to check. As described above, in a case where an abnormal region having a bending point is measured, a plurality of angle parameters is derived from target data, and an image is geometrically transformed to linearize the target, whereby it is possible to provide display that makes it easy for the user to check the entirety of the abnormal region.

Figure 11G:
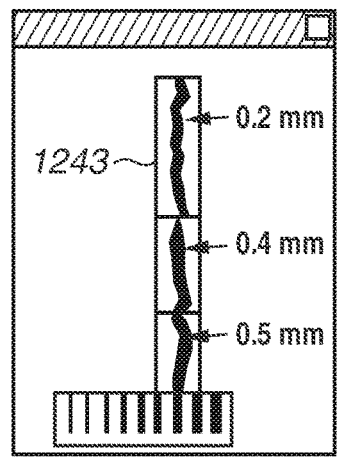

In the above connection process for the geometrically transformed image, the order of connection of the rectangular regions may be changed based on the attributes of the pieces of target data. For example, the maximum value of the target data is calculated with respect to each rectangular region, and the rectangular regions are joined together in ascending order of the calculated values. FIG. 11G illustrates an image 1243 obtained by rotating the rectangular regions (1252, 1253, and 1254) in FIG. 11E, calculating the maximum values of the pieces of target data, and then joining the regions in ascending order. In this case, the maximum values of the pieces of target data in the rectangular regions (1252, 1253, and 1254) are 0.4 mm, 0.5 mm, and 0.2 mm, respectively. The rectangular regions are thus joined together in the order of the maximum values of the pieces of target data, thereby facilitating the checking of the transition of the size of the abnormal region.

Figure 11H:
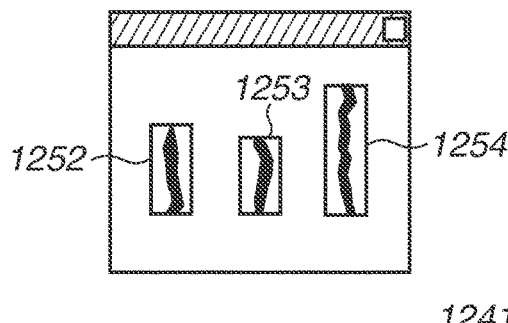

In the above display of the geometrically transformed image, a scale image does not necessarily need to be displayed. For example, in a case where the user wishes to find the largest portion of a single abnormal region, a method for displaying the geometrically transformed rectangular regions next to each other is effective. FIG. 11H is a diagram illustrating an example where the geometrically transformed rectangular regions (partial images) are displayed next to each other. In FIG. 11H, the rectangular regions (1252, 1253, and 1254) in FIG. 11E are rotated such that the directions of the pieces of target data are aligned, and then, the rectangular regions are displayed next to each other. The rectangular regions are thus displayed, and the relative sizes of divided parts of an abnormal region can be easily determined. Thus, it is easy to find the largest portion of the abnormal region. In this processing, the display order of the rectangular regions may be rearranged based on the attributes of the pieces of target data to facilitate the comparison between the rectangular regions. For example, the maximum value of the target data is calculated with respect to each rectangular region, and the rectangular regions (the partial images) are displayed next to each other in ascending order (or descending order) based on the sizes of the divided parts of the abnormal region. Rectangular regions (parts of the abnormal region) of which the maximum values of the pieces of target data are close each other are adjacent to each other. This facilitates the comparison between the sizes of the divided parts of the abnormal region.

Figure 11I:
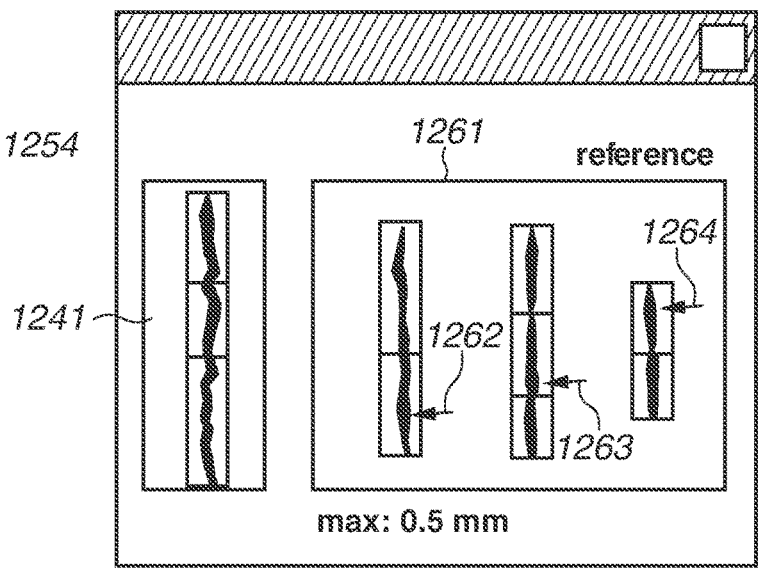

In crack inspection, the greater the width of the crack, the more attention the user needs to pay to the crack. Thus, it is effective to perform display that facilitates the finding of an abnormal region having a great width. For example, the scale image may be displayed for a partial image including the largest part of the abnormal region among the transformed partial images. Further, in a case where the user wishes to determine whether the maximum value of the abnormal region is correct, a method for displaying images including different abnormal regions having the same maximum values (or close maximum values) in comparison with each other is also effective. Further, FIG. 11I is a diagram in which an image 1241 after the geometric transformation and an image 1261 including different abnormal regions are displayed in comparison with each other. The images to be displayed in comparison with each other are images of which the maximum values of the pieces of target data are the same (0.5 mm in this example). The images are acquired from the image storing unit 103, similarly geometrically transformed, and displayed. In this processing, as earmarks indicating the positions of the maximum values, for example, arrows 1262, 1263, and 1264 are displayed. Images of which the maximum values of abnormal regions are the same (close) are thus displayed in such a manner that the directions of the abnormal regions are aligned, whereby whether the maximum value of an abnormal region is correct can be easily determined. Further, a portion of which the width is measured may not necessarily have the greatest width. For example, in a case where the direction in which a crack progresses (spreads) is known, the position (the second position) where the width of the crack is measured is determined based on this direction. This enables a more accurate measurement of the width of the crack.

In a case where the partial images cannot be displayed in a neatly aligned manner, the user may correct the display. For example, in a case where the inclination of a crack is erroneously acquired in some of a plurality of partial images, there is a possibility that the display of the partial images is not aligned. Further, the position of the crack slightly differs depending on the partial image. Thus, when the partial images are linearly aligned, crack regions are sometimes arranged in a non-straight line. In such a case, the user fine-adjusts the positions of the partial images using the GUI. In the correction of the display by the user, the user may be allowed to correct the display by operating the partial images displayed on the screen using the mouse and directly rotating the partial images. Further, the information processing apparatus may include a component for learning this correction work as teacher data. A learning unit (not illustrated) is a learning model to which an image including an abnormal region and vector data as the detection result of the abnormal region are input and which outputs an angle parameter for each of partial images obtained by dividing a display image at bending positions. The learning model is a neural network and a connection weight parameter of the neural network, and specifically, is a CNN. In the learning unit, an image including a crack (and the first position) is input to a model that has performed learning, and the model outputs an angle parameter for rotating a scale image to satisfy a predetermined condition. Teacher data is generated by the user inputting the angle parameter (e.g., the amount of rotation of each partial image) to an image including an abnormal region, and the learning model is caused to perform learning in advance using the teacher data. Specifically, for example, the learning model is caused to learn the angle parameter set by the user (e.g., the amount of rotation of the scale image orthogonal to the width of the crack) as a correct value. Every time the user corrects the display, the learning unit can output a correct amount of rotation. Thus, it is possible to display the partial images in a more easily viewable manner for the user.

<Third Variation>

Figure 12:
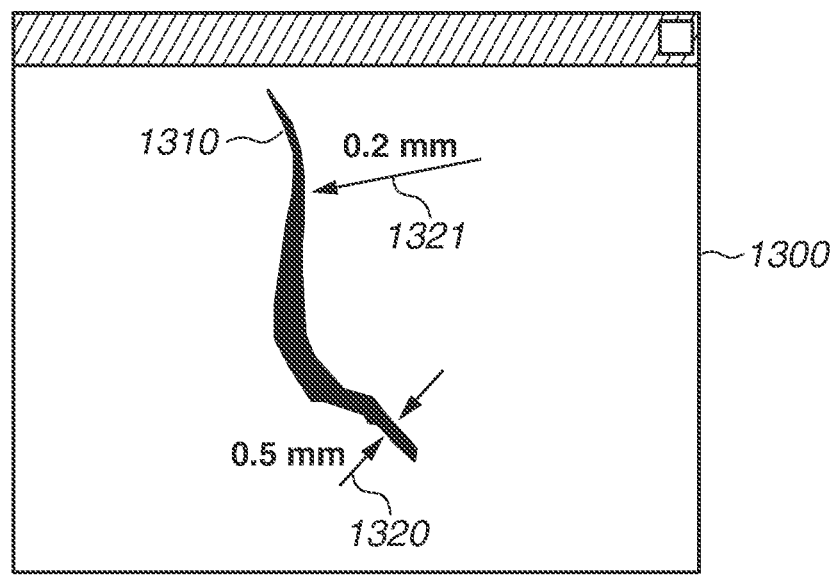
FIG. 12 is a diagram illustrating an example of a display of arrows.

In a third variation, as the display method for displaying the scale image, a display method using an object other than a scale image is described. As the display method using an object other than a scale image, for example, there is a display method using an arrow. FIG. 12 is a diagram illustrating an example of the display method using an arrow. In FIG. 12, an image including an abnormal region 1310 and arrows 1320 and 1321 are displayed in a superimposed manner in a window 1300. As the display method using an arrow, for example, there is a method for displaying arrows across a target to which attention is paid, as in the arrows 1320. The directions of the arrows may be rotated using an angle parameter based on attention target data, similarly to the rotation method in a case where a scale image is used. Further, if the space between the arrows is adjusted according to the value (the width in FIG. 12) of the attention target data, and the value of the attention target data is written next to the arrows, this results in display that is easily understandable by the user. Alternatively, based on the attributes, the state, or the value of the attention target data, the size, the shape, or the color of each arrow may be changed. A plurality of arrows may not need to be displayed, and for example, a single arrow may be displayed from a single direction as in the arrow 1321.

The above display method using an arrow is effective also in representing information that cannot be represented on an image. For example, in a case where the depth of a crack in an image of a concrete wall surface is checked, it is difficult to display, on a two-dimensional image, the depth of the crack in the depth direction of the screen. In this case, for example, at the position of a target to which attention is paid, an arrow and a numerical value indicating the depth of the crack are displayed. Alternatively, according to the depth of the crack, the length, the color, or the size of the arrow may be changed. The arrow is displayed, whereby it is possible to display additional information regarding an abnormal region. This is highly convenient for the user.

<Fourth Variation>

In a fourth variation, a display parameter other than the angle parameter is described. Specifically, an example is illustrated where transparency a (a transparent parameter) is derived as a display parameter. The background of a scale image is made transparent, whereby an abnormal region and the scale image can be easily compared.

Figure 13A:
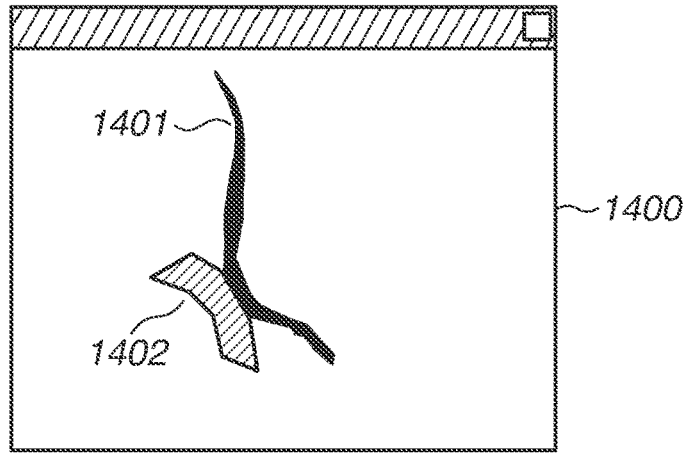
FIGS. 13A to 13C are diagrams illustrating examples of a transparently displayed scale image.
Figure 13B:
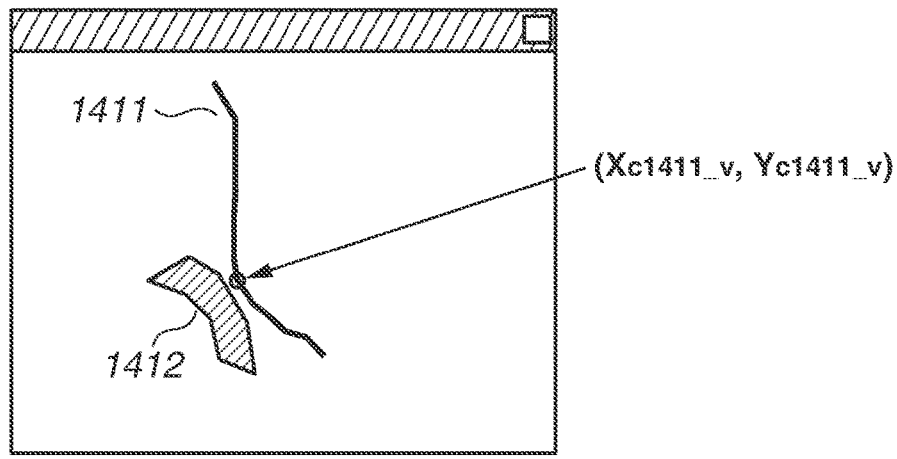
Figure 13C:
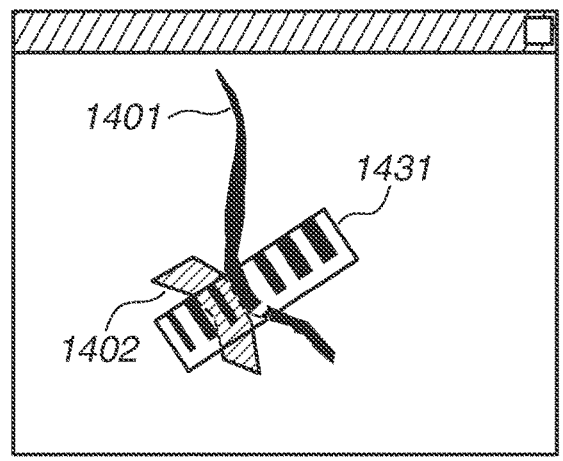

FIGS. 13A to 13C are diagrams illustrating this exemplary embodiment. FIG. 13A illustrates the state where an image representing a plurality of abnormal regions present close to each other is displayed in a window 1400. Specifically, a crack 1401 and exfoliation 1402 are present. FIG. 13B illustrates pieces of target data 1411 and 1412 corresponding to FIG. 13A. In FIGS. 13A and 13B, the coordinates $(X_{C1411\_v}, Y_{C1411\_v})$ of the target data 1411 are determined as attention target data by user selection. In the fourth variation, transparency a is set for the background (a region other than the marks) of a scale image. The transparency a is set by the user inputting a numerical value or providing an input using a parameter bar on the GUI.

A case is described where the transparency a is used as a display parameter. The transparency a is an alpha value for transparently displaying the background of the scale image and is a parameter having a value from 0% to 100%. The derivation unit 106 sets the transparency a of the background of the scale image to an alpha value (e.g., 50%) set in advance. Consequently, the background of the scale image is transparently displayed at the transparency a.

FIG. 13C illustrates the state where the background of a scale image 1431 is transparently displayed. Portions of the abnormal regions (crack 1401 and exfoliation 1402) overlapping the scale image 1431 (portions surrounded by dotted lines) indicate that the background of the scale image 1431 is transparently displayed. This display enables the user to check in detail the abnormal regions including also the portions overlapping the scale image.

In the above description, an example has been described where the derivation unit sets the value set in advance to the transparency a. The transparency a may be set based on the distance from the direction of the principal line of attention target data. For example, the transparency of the background of a portion of the scale image close to the principal line of the attention target data is set to be high. Then, the transparency is set in such a manner that the greater the distance from the principal line of the attention target data, the transparency is set lower. As a result of this, the background is transparent near the attention target data, and the further away from the attention target data, the more clearly the background is displayed. Consequently, the user can easily view an image near the attention target data, and can also check the scale image.

<Fifth Variation>

In a fifth variation, a description is given of a method for displaying images of abnormal regions other than an abnormal region that is being referenced, to compare abnormal regions. When the user checks an image to determine whether target data is correct, the image is displayed in comparison with related information. Normally, when a minute target such as a crack in an image of a concrete wall surface is measured, a part of the image is displayed in an enlarged manner. In a case where the image is enlarged, the display range becomes narrow. Thus, it is difficult to simultaneously display an abnormal region to which attention is paid and a scale image suitable for comparison. In such a case, a partial image including the abnormal region and partial images related to attention target data are displayed next to each other. Consequently, display that is easy for the user to check can be provided.

Figure 14A:
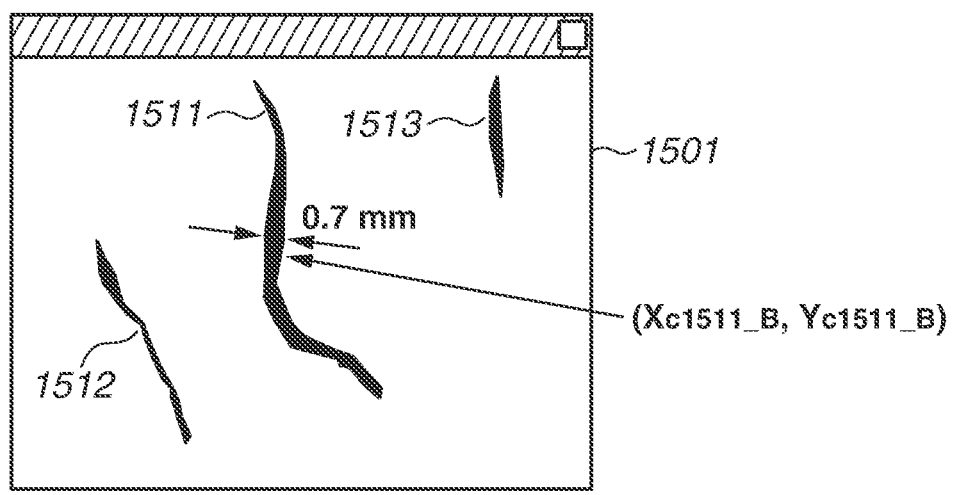
FIGS. 14A and 14B are diagrams illustrating examples of displays of images as comparison targets.
Figure 14B:
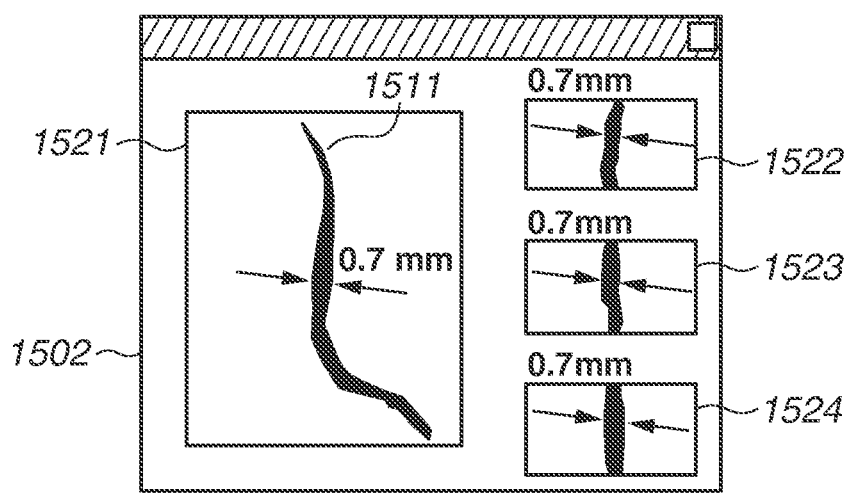

With reference to FIGS. 14A and 14B, a specific example is described. FIG. 14A is a diagram in which an image of a concrete wall surface including a plurality of abnormal regions and a scale image using arrows are displayed in an overlapping manner in a window 1501. Specifically, a plurality of cracks 1511, 1512, and 1513 is present. In FIGS. 14A and 14B, the coordinates $(X_{c1511\_B}, Y_{c1511\_B})$ of the crack 1511 are selected as attention target data by user selection. In this case, to check the width of the portion of the attention target data $(X_{c1511\_B}, Y_{c1511\_B})$, the attention target data is compared with a crack having a similar width. In FIG. 14A, however, a crack having a similar width is not present. Thus, it is difficult to determine the width of the attention target data by comparing cracks in the window 1501. In such a case, the image storing unit 103 and the data storing unit 104 are searched for an image portion having a width close to the width of the attention target data. An image obtained by the search and an image of the attention target portion are displayed next to each other, so that an image to be displayed that is easy for the user to check is obtained. FIG. 14B illustrates the state where an image 1521 of the periphery of the crack (attention target) 1511 and crack images 1522, 1523, and 1524 having width similar to that of the image 1521 are displayed next to each other in a window 1502. In this processing, according to the exemplary embodiment, it is desirable to rotate the images 1522, 1523, and 1524 using angle parameters in such a manner that the directions of the images 1522, 1523, and 1524 are aligned with the direction of the attention target on the image 1521.

According to the above described exemplary embodiment, a description has been given of the work of checking a target, such as a crack, using an image of a concrete wall surface. Some embodiments, however, are not limited to this. Alternatively, some embodiments may be used for another purpose. A description is given of other exemplary embodiments that are used in the work of checking a defect, such as a scratch from an image of a product in a factory (external appearance inspection), and the work of checking a lesion, such as the coarctation of a blood vessel from a captured image of a human body in a hospital (a medical diagnosis).

An example is described of a case where an embodiment is used in external appearance inspection. In the external appearance inspection, it is determined whether the external appearance of a product manufactured in a factory satisfies quality requirements. In this inspection, an automatic or manual detection process is performed using a product image, and a minute scratch or stain on a product surface is detected as a defect. An inspection target object is a product, and an abnormal region is a portion where there is a scratch or breakage. In the work of checking this detection result, the user checks the detection result and the image and corrects the result where necessary. The information processing apparatus is used in such image checking work, whereby it is possible to improve the efficiency of the work.

Figure 15A:
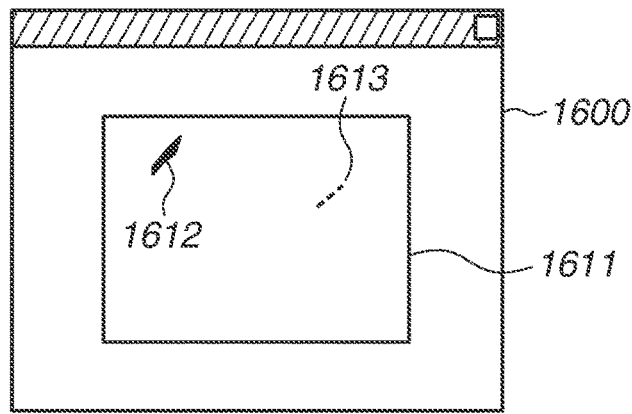
FIGS. 15A to 15D are diagrams illustrating examples of an image in external appearance inspection.
Figure 15B:
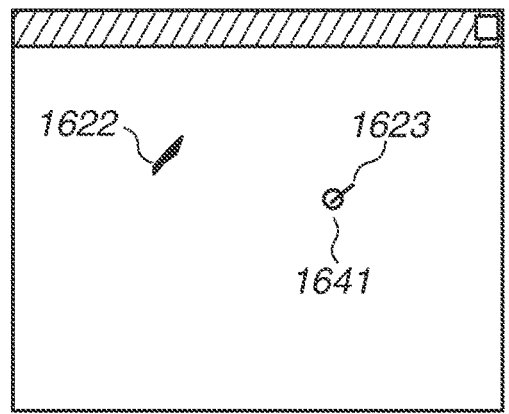

FIGS. 15A to 15D are diagrams illustrating examples of the external appearance inspection. FIG. 15A is an image of an object 1611, such as a component or a product, as an external appearance inspection target, and the image is stored in the image storing unit 103. In the external appearance of the object 1611, defects 1612 and 1613, such as scratches, are present. From the image including these defects, defect data regarding the position and the type of each defect is generated by an automatic detection process or an input process performed by a user. The generated defect data is stored in the data storing unit 104. FIG. 15B is a diagram in which the defect data generated from the image in FIG. 15A is displayed in a window 1600.

Figure 15C:
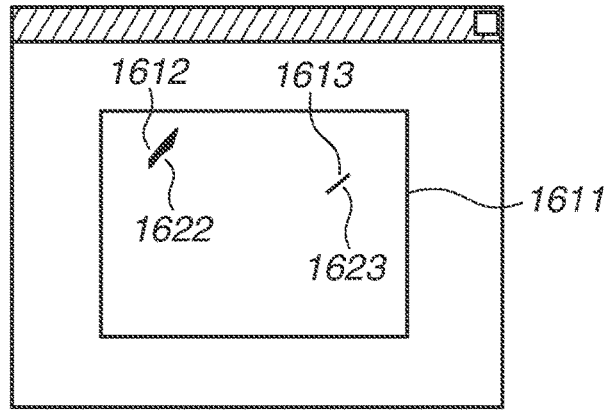
Figure 15D:
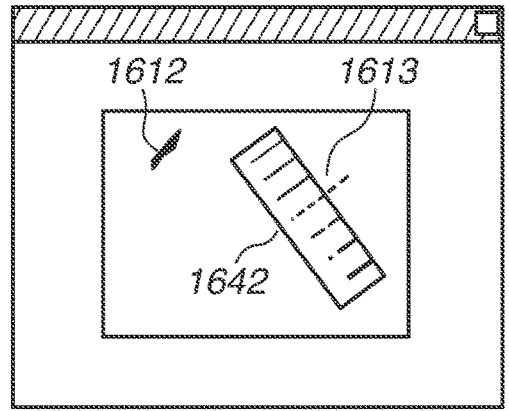

With reference to FIG. 5, a description is given of the processing procedure executed by the information processing apparatus 100 in the external appearance inspection. In S501, the acquisition unit 110 acquires target data from the image storing unit 103 and acquires an image and defect data from the data storing unit 104. In S502, the display control unit 107 displays the acquired image and target data in a superimposed manner on the display unit 109. FIG. 15C illustrates the state where the product image in FIG. 15A and the defect data in FIG. 15B are displayed in a superimposed manner. In FIG. 15C, similarly to the display 141 in FIG. 2, the product image overlaps the defect data, and therefore, it is difficult to perform measurement and determination. Next, in S503, the determination unit 105 determines attention target data based on an instruction from the user. In this case, an end 1641 of target data 1623 is determined as the attention target data. In S505, the derivation unit 106 derives a display parameter based on the attention target data. Finally, in S506, the display control unit 107 displays a scale image in a superimposed manner on the product image on the display unit 109 using the obtained display parameter. FIG. 15D illustrates the state where the generated image is displayed. FIG. 15D illustrates the state where, similarly to the display 142 in FIG. 2, a scale image 1642 is displayed to the end (attention target data) 1641, and it is easy to check the scale image 1642 and the end (attention target data) 1641. The processing of the above described procedure is similar to those of the above exemplary embodiments except for the image and the target data to be used. Thus, individual processes are not described in detail here.

An example is described of a case where the information processing apparatus is used in medical diagnostic imaging. In the medical diagnostic imaging, an image and information regarding a patient are acquired using a medical diagnosis apparatus, such as an X-ray apparatus or a computed tomography (CT) scan. A doctor checks the presence or absence of a lesion or the symptom of a lesion using the acquired image and diagnoses the health condition of the patient. In this diagnosis, an automatic detection process or a manual detection process is performed, to determine whether the symptom of a lesion or an abnormal change is present in the image acquired for checking the health condition. In the work of checking whether the detection result is correct, an expert, such as a doctor, uses the detection result and the image and corrects the detection result where necessary. The information processing apparatus is used in such work, whereby it is possible to improve the efficiency of diagnosis work.

Figure 16A:
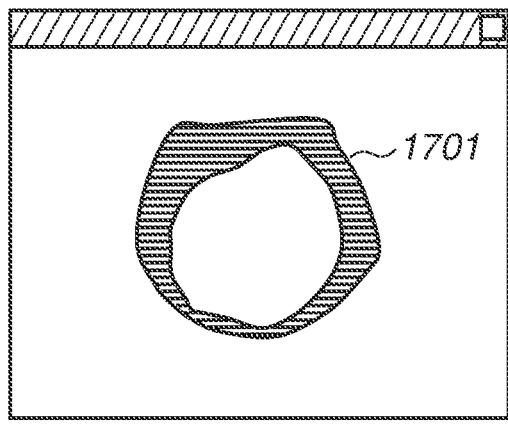
FIGS. 16A to 16D are diagrams illustrating examples of an image in a medical diagnosis.
Figure 16B:
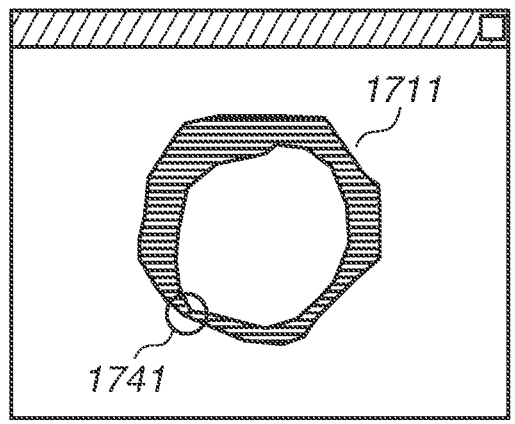

FIGS. 16A to 16D are diagrams illustrating examples of the medical diagnosis. An inspection target object is a human body, and an abnormal region is a lesion portion. In FIG. 16A, as an example of a medical diagnosis target, an image obtained by capturing a cross section 1701 of a blood vessel of a patient using a CT scan is displayed in a window 1700. The image is stored in the image storing unit 103. In the cross section 1701, medical information regarding the thickness of the blood vessel wall is present. From this image, medical data indicating the position and the type regarding the medical information is generated by an automatic detection process or an input process performed by a user. The generated medical data is stored in the data storing unit 104. FIG. 16B is a diagram in which the medical data generated from the image in FIG. 16A is displayed.

Figure 16C:
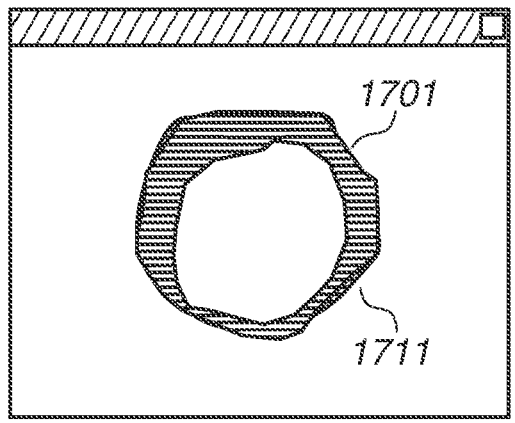
Figure 16D:
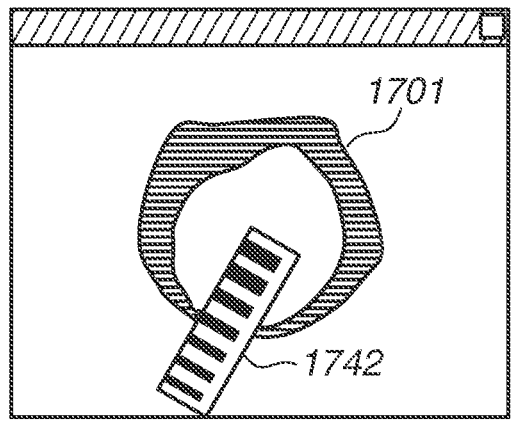

With reference to FIG. 5, a description is given of the processing procedure executed by the information processing apparatus 100 in the medical diagnosis. First, in S501, the acquisition unit 110 acquires an image and medical data from the image storing unit 103 and the data storing unit 104. In S502, the display control unit 107 displays the image and the medical data in a superimposed manner on the display unit 109. FIG. 16C illustrates the state where the image of the blood vessel in FIG. 16A and the medical data in FIG. 16B are displayed in a superimposed manner. In FIG. 16C, similarly to the display 141 in FIG. 2, the cross section of the blood vessel overlaps the medical data, and therefore, it is difficult to perform measurement and determination. Next, in S503, the determination unit 105 determines attention target data based on an instruction from the user. In this case, thin portion data 1741 of target data 1711 is determined as the attention target data. In S505, the derivation unit 106 derives a display parameter based on the attention target data. Finally, in S506, the display control unit 107 displays a scale image in a superimposed manner on the cross-sectional image of the blood vessel on the display unit 109 using the display parameter. FIG. 16D is a diagram in which the generated image is displayed. FIG. 16D illustrates the state where a scale image 1742 is displayed to the attention target data 1741, and it is easy to check the scale image 1742 and the attention target data 1741. Also in the above processing of the medical diagnosis, similarly to the external appearance inspection, the image and the target data to be used are merely changed, whereby it is possible to use the information processing apparatus.

Figure 17:
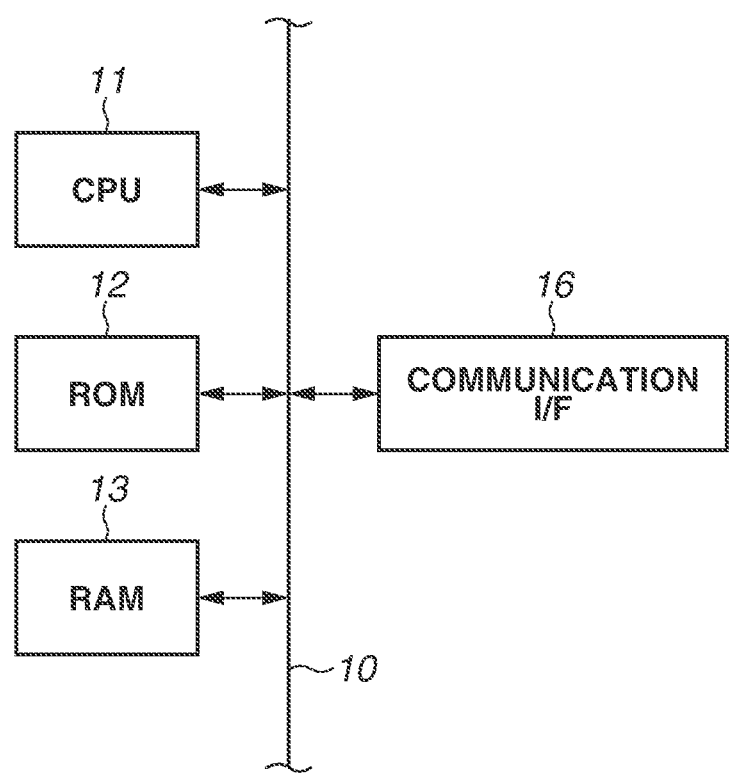
FIG. 17 is a diagram illustrating an example of a configuration of hardware.

The information processing apparatus 100 can be achieved using a general personal computer (PC), built-in hardware, or a programmable logic controller (PLC) illustrated in FIG. 17. The information processing apparatus 100 includes a bus 10, a CPU 11, a read-only memory (ROM) 12, a random-access memory (RAM) 13, and a communication interface (I/F) 16. A computer program and data for causing the CPU 11 of the PC, the built-in hardware, or the PLC to execute the functions of components are stored in a hard disk device. The CPU 11 can appropriately load the computer program and the data stored in the hard disk device or a flash memory device into a memory such as the RAM 13 and execute processing using the computer program and the data. As a result, the PC, the built-in hardware, or the PLC can achieve the functions of the information processing apparatus 100. Further, a configuration may be employed in which a display device and an input device are included in addition to the illustrated hardware. The display device is, for example, a display. The input device is, for example, a mouse and a keyboard and receives an operation of the user.

According to some embodiments, by a simple operation, it is possible to appropriately display a scale image for each region to which attention is paid.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

What is claimed is:

1. An information processing apparatus for displaying an arrow image for measuring an abnormal region in an image of an inspection target object, the information processing apparatus comprising:
   one or more storage media; and
   one or more processors, wherein the one or more processors and the one or more storage media are configured to:
   input the image including the abnormal region to a learning model, wherein the learning model is configured to output an amount of rotation of the arrow image with respect to the abnormal region in a case where the image including the abnormal region is input to the learning model; and
   control a display to display the arrow image based on the amount of rotation output from the learning model.

2. The information processing apparatus according to claim 1, wherein the one or more processors and the one or more storage media are further configured to control the display to display a plurality of arrow images as the arrow image.

3. The information processing apparatus according to claim 2, wherein the one or more processors and the one or more storage media are further configured to control the display to display the plurality of arrow images so that the plurality of arrow images sandwich the abnormal region.

4. The information processing apparatus according to claim 2, wherein the one or more processors and the one or more storage media are further configured to control the display to display the plurality of arrow images so that a part of the abnormal region is positioned in a space between the plurality of arrow images.

5. The information processing apparatus according to claim 1, wherein the one or more processors and the one or more storage media are further configured to control the display to display a value of the abnormal region so that the value of the abnormal region is written next to the arrow image.

6. The information processing apparatus according to claim 5, wherein the value of the abnormal region is a width of a part of the abnormal region.

7. The information processing apparatus according to claim 5, wherein the value of the abnormal region is a depth of a part of the abnormal region.

8. The information processing apparatus according to claim 5, wherein the one or more processors and the one or more storage media are further configured to control the display to display one arrow image as the arrow image.

9. The information processing apparatus according to claim 1, wherein the one or more processors and the one or more storage media are further configured to control the display to display one arrow image as the arrow image.

10. The information processing apparatus according to claim 1, wherein the inspection target object is a concrete structure, and
    wherein the abnormal region indicates a crack present on a surface of the concrete structure.

11. An information processing method for displaying an arrow image for measuring an abnormal region in an image of an inspection target object, the information processing method comprising:

obtaining a direction in which a crack extends in the image of the inspection target;

generating an amount of rotation of an arrow image with respect to a width of the crack based on the direction obtained; and displaying the arrow image based on the amount of rotation generated.

12. The information processing method according to claim 11, further comprising:

obtaining a position of the crack;

displaying a plurality of arrow images so that the plurality of arrow images sandwiches the crack from a direction of the width of the crack based on the position of the crack obtained, wherein the plurality of arrow images include the arrow image; and displaying the plurality of arrow images so that the crack is positioned in a space between the plurality of arrow images based on the position of the crack.

13. The information processing method according to claim 11, further comprising:

obtaining a value of the width of the crack; and displaying the value of the width of the crack next to the arrow image.

14. A non-transitory computer-readable storage medium that stores computer-executable instructions for causing an information processing apparatus to:

input an abnormal region to a learning model, wherein the learning model is configured to output an amount of rotation of an arrow image with respect to the abnormal region in a case where the image including the abnormal region is input to the learning model; and control a display to display the arrow image based on the amount of rotation output from the learning model.

15. An information processing method for displaying an arrow image for measuring an abnormal region in an image of an inspection target object, the information processing method comprising:

obtaining a direction in which a crack extends in the image of the inspection target and a position of the crack;

generating an amount of rotation of an arrow image with respect to a width of the crack based on the direction obtained;

estimating a value of the width of the crack based on the image;

displaying a plurality of arrow images so that the plurality of arrow images sandwiches the crack from a direction of the width of the crack based on the position of the crack obtained and the amount of rotation generated, wherein the plurality of arrow images includes the arrow image; and displaying the value of the width of the crack next to the plurality of arrow images.

\* \* \* \* \*